(12) United States Patent
Lee et al.

(10) Patent No.: US 12,439,415 B2
(45) Date of Patent: Oct. 7, 2025

(54) SIDELINK HARQ FEEDBACK AND RESOURCE POOL SELECTION

(71) Applicant: LG ELECTRONICS INC., Seoul (KR)

(72) Inventors: Youngdae Lee, Seoul (KR); Giwon Park, Seoul (KR); Jongyoul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 532 days.

(21) Appl. No.: 17/760,383

(22) PCT Filed: Apr. 8, 2021

(86) PCT No.: PCT/KR2021/004408
§ 371 (c)(1),
(2) Date: Aug. 9, 2022

(87) PCT Pub. No.: WO2021/206466
PCT Pub. Date: Oct. 14, 2021

(65) Prior Publication Data
US 2023/0083274 A1    Mar. 16, 2023

(30) Foreign Application Priority Data
Apr. 9, 2020    (KR) .................. 10-2020-0043636

(51) Int. Cl.
*H04W 72/23*    (2023.01)
*H04L 1/1812*    (2023.01)
(Continued)

(52) U.S. Cl.
CPC ............ *H04W 72/23* (2023.01); *H04L 1/1812* (2013.01); *H04W 72/02* (2013.01); *H04W 80/02* (2013.01)

(58) Field of Classification Search
CPC ...... H04W 72/23; H04W 72/02; H04W 80/02; H04L 1/1812
See application file for complete search history.

(56) References Cited

U.S. PATENT DOCUMENTS

2018/0049084 A1* 2/2018 Lee .................. H04W 36/06
2019/0239112 A1* 8/2019 Rao .................... H04L 1/08
(Continued)

OTHER PUBLICATIONS

Korean Intellectual Property Office Application No. 10-2022-7039279, Notice of Allowance dated Oct. 5, 2023, 2 pages.
(Continued)

*Primary Examiner* — Jael M Ulysse
(74) *Attorney, Agent, or Firm* — LEE, HONG, DEGERMAN, KANG & WAIMEY

(57) ABSTRACT

A method and apparatus for sidelink hybrid automatic repeat request (HARQ) feedback and resource pool selection is provided. When user equipment (UE) autonomous resource selection is configured, a wireless device selects a resource pool configured with physical sidelink feedback channel (PSFCH) resources, among one or more resource pools allowed for a logical channel, based on i) sidelink data being available in the logical channel, ii) any resource pool being not selected for the logical channel, and iii) hybrid automatic repeat request (HARQ) feedback being enabled for the logical channel.

14 Claims, 12 Drawing Sheets

(51) Int. Cl.
*H04W 72/02* (2009.01)
*H04W 80/02* (2009.01)

(56) References Cited

U.S. PATENT DOCUMENTS

| | | | | |
|---|---|---|---|---|
| 2020/0008183 | A1* | 1/2020 | Chen | H04W 72/20 |
| 2020/0053699 | A1* | 2/2020 | Chen | H04W 4/44 |
| 2020/0084659 | A1* | 3/2020 | Pan | H04W 28/06 |
| 2020/0146082 | A1* | 5/2020 | Chen | H04W 4/40 |
| 2020/0275474 | A1* | 8/2020 | Chen | H04L 1/1607 |
| 2020/0344771 | A1* | 10/2020 | Kang | H04W 76/14 |
| 2021/0028910 | A1* | 1/2021 | Cheng | H04L 5/0064 |
| 2021/0029692 | A1* | 1/2021 | Hui | H04W 72/51 |
| 2021/0045178 | A1* | 2/2021 | Kung | H04W 76/18 |
| 2021/0099994 | A1* | 4/2021 | Park | H04L 1/1861 |
| 2021/0105126 | A1* | 4/2021 | Yi | H04L 5/0055 |
| 2021/0136810 | A1* | 5/2021 | Kung | H04B 7/0626 |
| 2021/0153169 | A1* | 5/2021 | Lin | H04L 5/006 |
| 2021/0351877 | A1* | 11/2021 | Xu | H04W 72/20 |
| 2022/0070876 | A1* | 3/2022 | Bangolae | H04W 4/40 |
| 2023/0084524 | A1* | 3/2023 | Zhang | H04L 1/189 |
| 2024/0224282 | A1* | 7/2024 | Hui | H04L 5/0055 |
| 2024/0397516 | A1* | 11/2024 | Hui | H04L 1/1864 |

OTHER PUBLICATIONS

Ericsson, "PHY layer procedures for NR sidelink," R1-1908917, 3GPP TSG-RAN WG1 Meeting #98, Aug. 2019, 11 pages.
Huawei et al., "On SL LCP mapping restriction for HARQ feedback enable and disable," R2-2000709, 3GPP TSG-RAN WG2 Meeting# 109 electronic, Mar. 2020, 6 pages.
PCT International Application No. PCT/KR2021/004408, International Search Report dated Jul. 1, 2021, 1 page.
Ericsson, "Support of HARQ procedure over sidelink," R2-1913327, 3GPP TSG-RAN WG2 #107bis, Oct. 2019, 12 pages.
Ericsson, "Left issues for configured sidelink grant," R2-1910138, 3GPP TSG-RAN WG2 #107, Aug. 2019, 5 pages.
Ericsson, "On congestion control for NR sidelink," R1-1907144, 3GPP TSG-RAN WG1 #97, May 2019, 5 pages.
Intel Corporation, "Summary#3 for AI 7.2.4.2.2 Mode-2 Resource Allocation," R1-1913525, 3GPP TSG RAN WG1 Meeting #99, Nov. 2019, 48 pages.
Oppo, "Discussions on resource reservation, sensing and selection in Mode 2," R1-1912794, 3GPP TSG-RAN WG1 Meeting #99, Nov. 2019, 14 pages.
3rd Generation Partnership Project, "Technical Specification Group Radio Access Network; NR; NR and NG-RAN Overall Description; Stage 2 (Release 16)," Sections 5.7 and 16.9 of 3GPP TS 38.300 V16.1.0, Mar. 2020, 133 pages.
3rd Generation Partnership Project, "Technical Specification Group Radio Access Network; NR; Medium Access Control (MAC) protocol specification (Release 16)," Sections 5.22.1 and 5.22.2 of 3GPP TS 38.321 V16.0.0, Mar. 2020, 141 pages.
Vivo, "Resource pool (re-)selection based on HARQ feedback," R2-2000282, 3GPP TSG-RAN WG2 Meeting #109-e, Mar. 2020, 4 pages.
Korean Intellectual Property Office Application No. 10-2022-7039279, Office Action dated Apr. 6, 2023, 5 pages.
Ericsson, "Discussion on SL Mode 2 left issues, " 3GPP TSG-RAN WG2 #109-e, Meeting, R2-2000882, Feb. 2020, 6 pages.
Ericsson, "On congestion control for NR sidelink," 3GPP TSG-RAN WG1 #97, R1-1907144, May 2019, 3 pages.

* cited by examiner

SIDELINK HARQ FEEDBACK AND RESOURCE POOL SELECTION

CROSS-REFERENCE TO RELATED APPLICATION(S)

This application is the National Stage filing under 35 U.S.C. 371 of International Application No. PCT/KR2021/004408, filed on Apr. 8, 2021, which claims the benefit of earlier filing date and right of priority to Korean Application No. 10-2020-0043636, filed on Apr. 9, 2020, the contents of which are all hereby incorporated by reference herein in their entireties.

TECHNICAL FIELD

The present disclosure relates to sidelink hybrid automatic repeat request (HARQ) feedback and resource pool selection.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future. The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

SUMMARY

An aspect of the present disclosure is to provide a method and apparatus for selecting a resource pool for a logical channel for which sidelink hybrid automatic repeat request (HARQ) feedback is enabled.

In an aspect, a method performed by a first wireless device operating in a wireless communication system is provided. The method includes, when user equipment (UE) autonomous resource selection is configured, selecting a resource pool configured with physical sidelink feedback channel (PSFCH) resources, among one or more resource pools allowed for a logical channel, based on i) sidelink data being available in the logical channel, ii) any resource pool being not selected for the logical channel, and iii) hybrid automatic repeat request (HARQ) feedback being enabled for the logical channel.

In another aspect, a method performed by a second wireless operating in a wireless communication system is provided. The method includes receiving, from a first wireless device, a media access control (MAC) protocol data unit (PDU) based on a selected resource pool, which is configured with physical sidelink feedback channel (PSFCH) resources, and selected among one or more resource pools allowed for a logical channel, based on i) sidelink data being available in the logical channel, ii) any resource pool being not selected for the logical channel, and iii) hybrid automatic repeat request (HARQ) feedback being enabled for the logical channel.

In another aspect, apparatuses for implementing the above methods are provided.

The present disclosure can have various advantageous effects.

For example, if physical sidelink feedback channel (PSFCH) resources are only configured in certain resource pools, a resource pool can be effectively selected for a logical channel with sidelink HARQ feedback enabled.

For example, a UE performing transmissions on configured grants can properly confirm activation or deactivation of a configured grant, in particular when multiple configured grants are configured.

For example, the system can properly handle confirmation of configured grants for a UE performing transmissions on configured grants.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
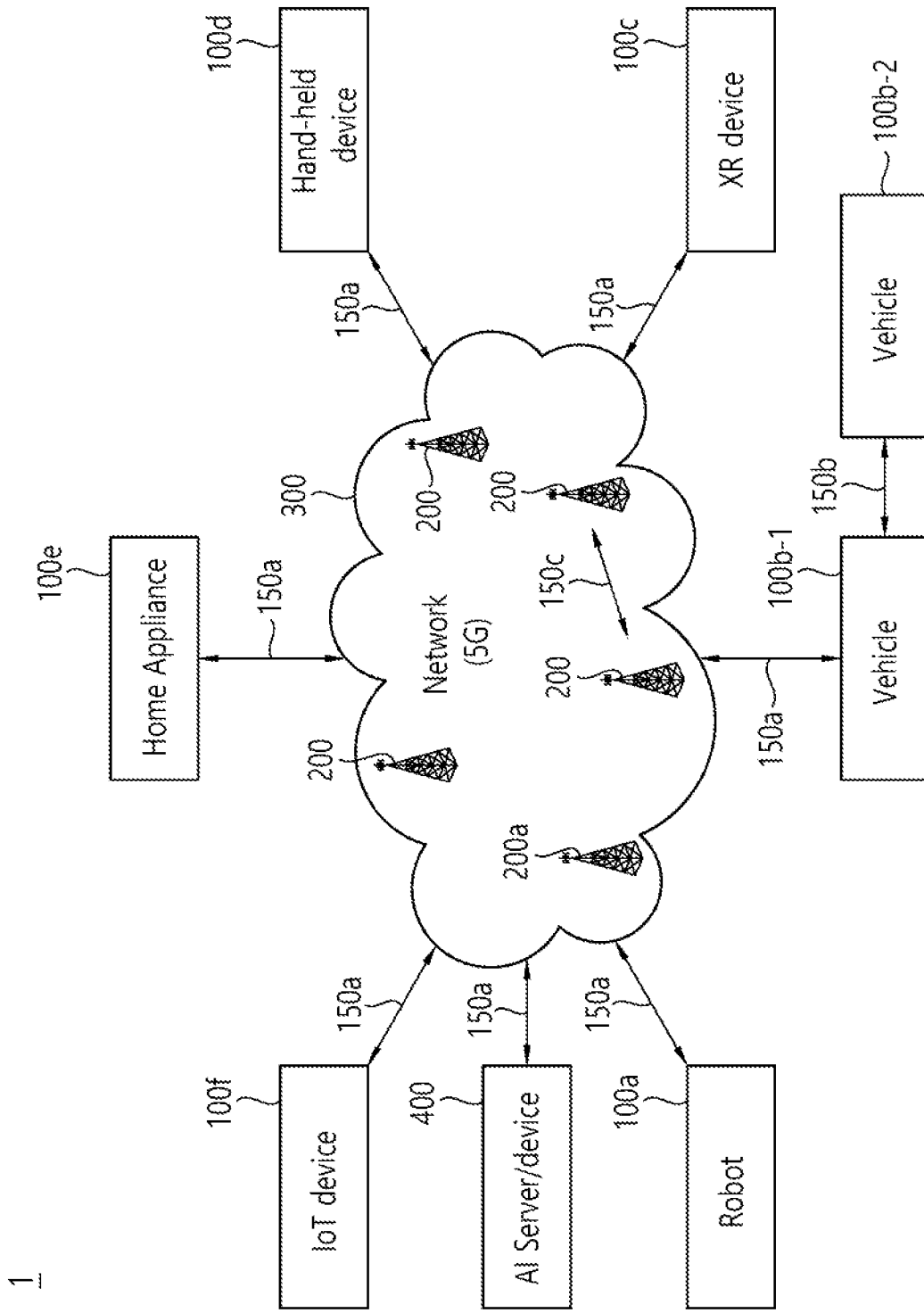
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G new radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set.

The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
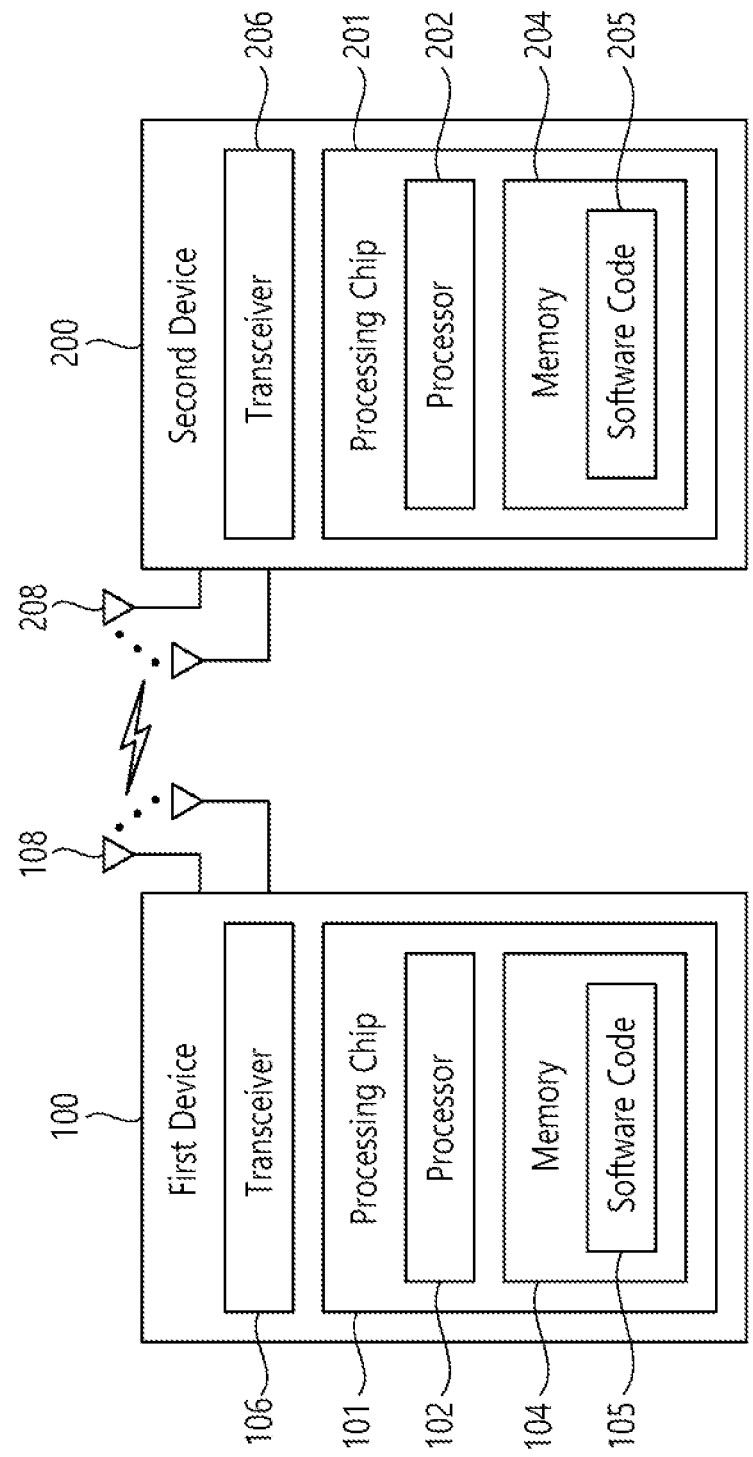
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
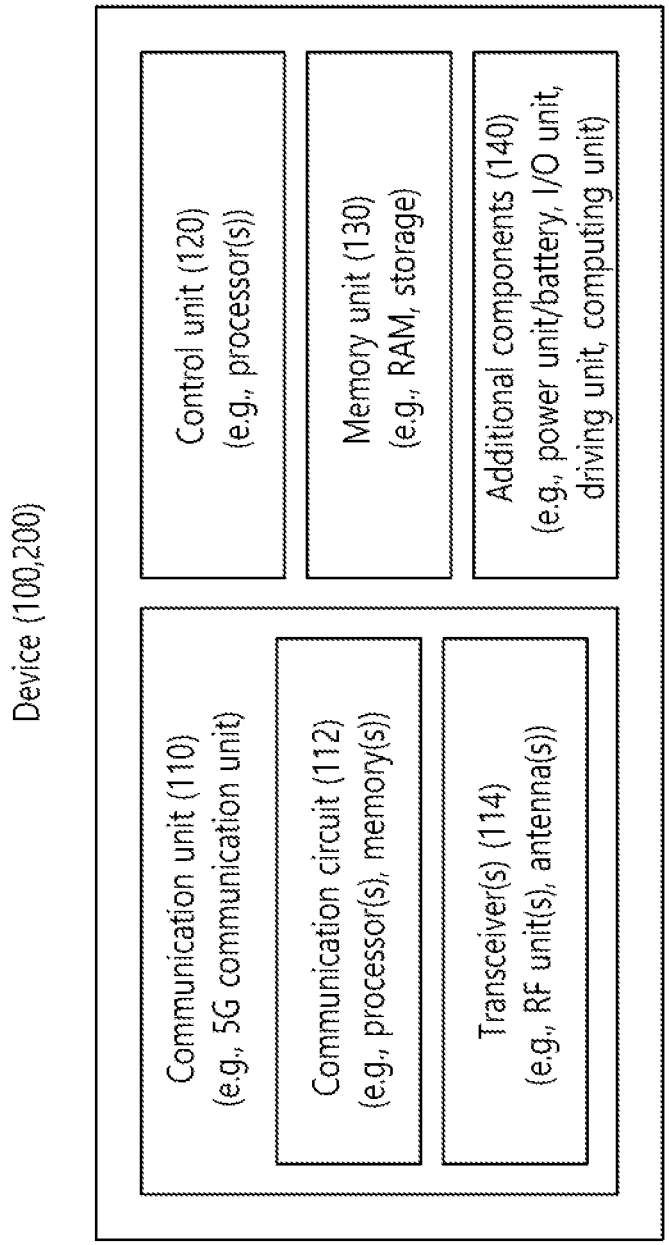
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the B Ss (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
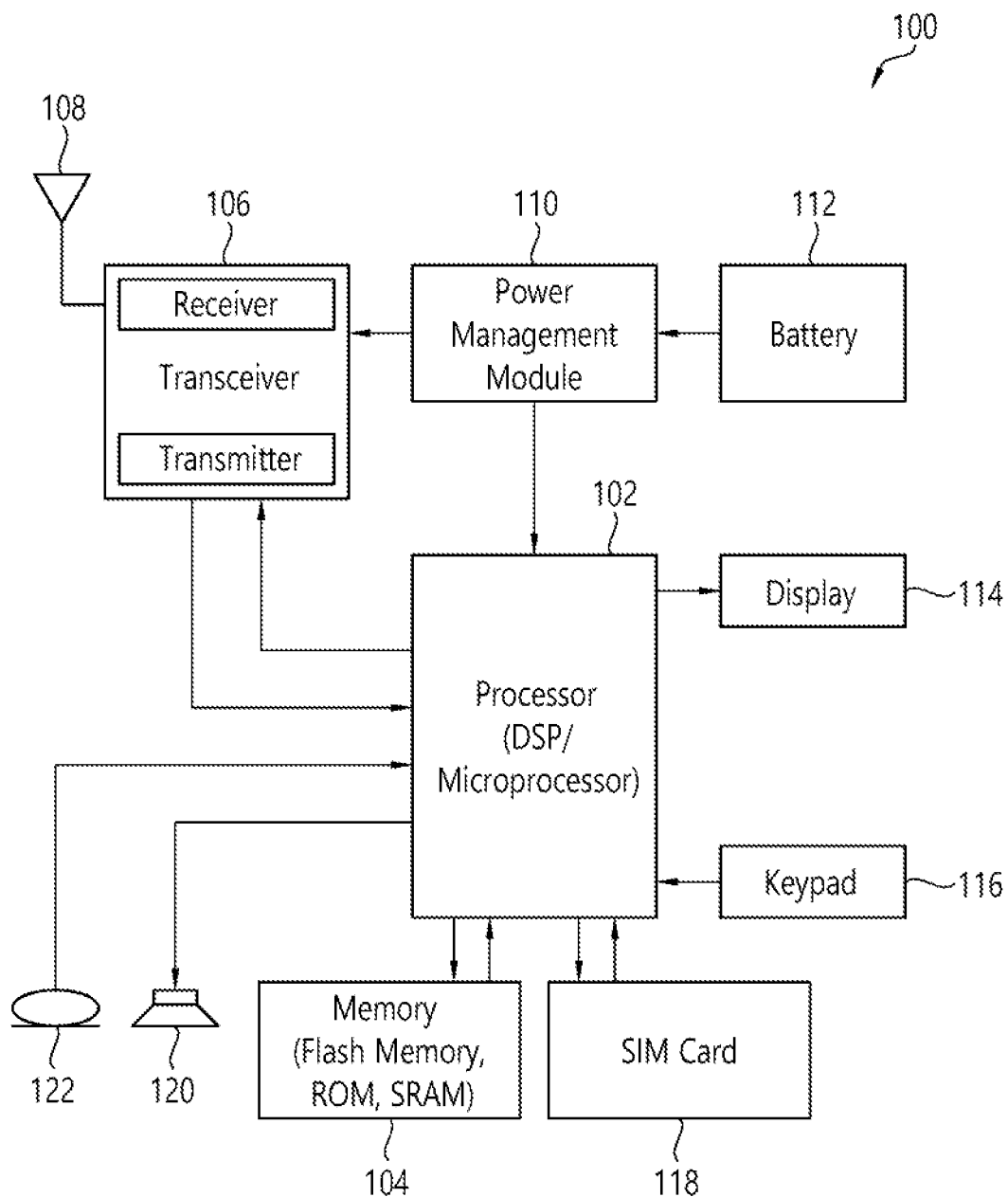
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
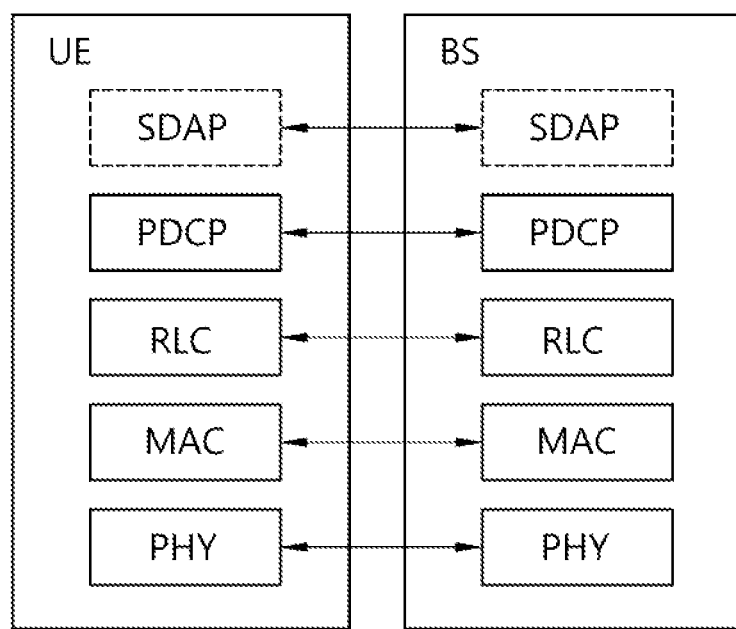
FIGS. 5 and 6 show an example of protocol stacks in a 3GPP based wireless communication system to which implementations of the present disclosure is applied.
Figure 6:
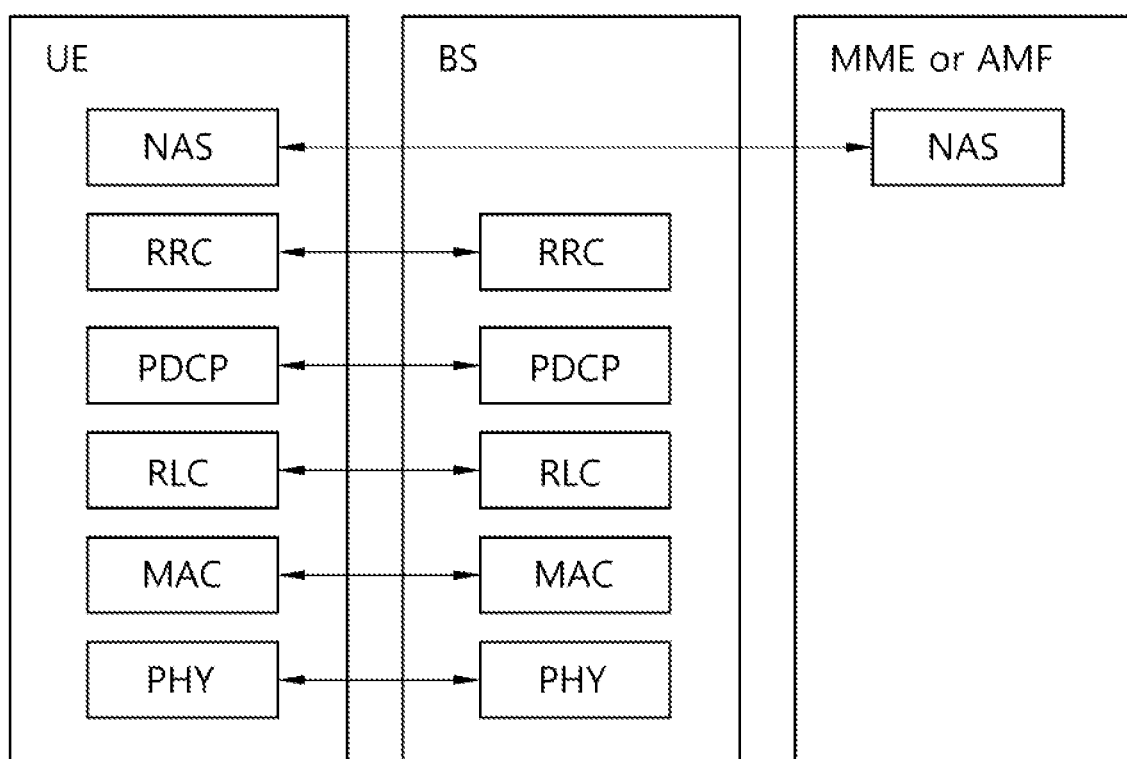

FIGS. 5 and 6 show an example of protocol stacks in a 3GPP based wireless communication system to which implementations of the present disclosure is applied.

In particular, FIG. 5 illustrates an example of a radio interface user plane protocol stack between a UE and a BS and FIG. 6 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 5, the user plane protocol stack may be divided into Layer 1 (i.e., a PHY layer) and Layer 2. Referring to FIG. 6, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/demultiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels.

Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 7:
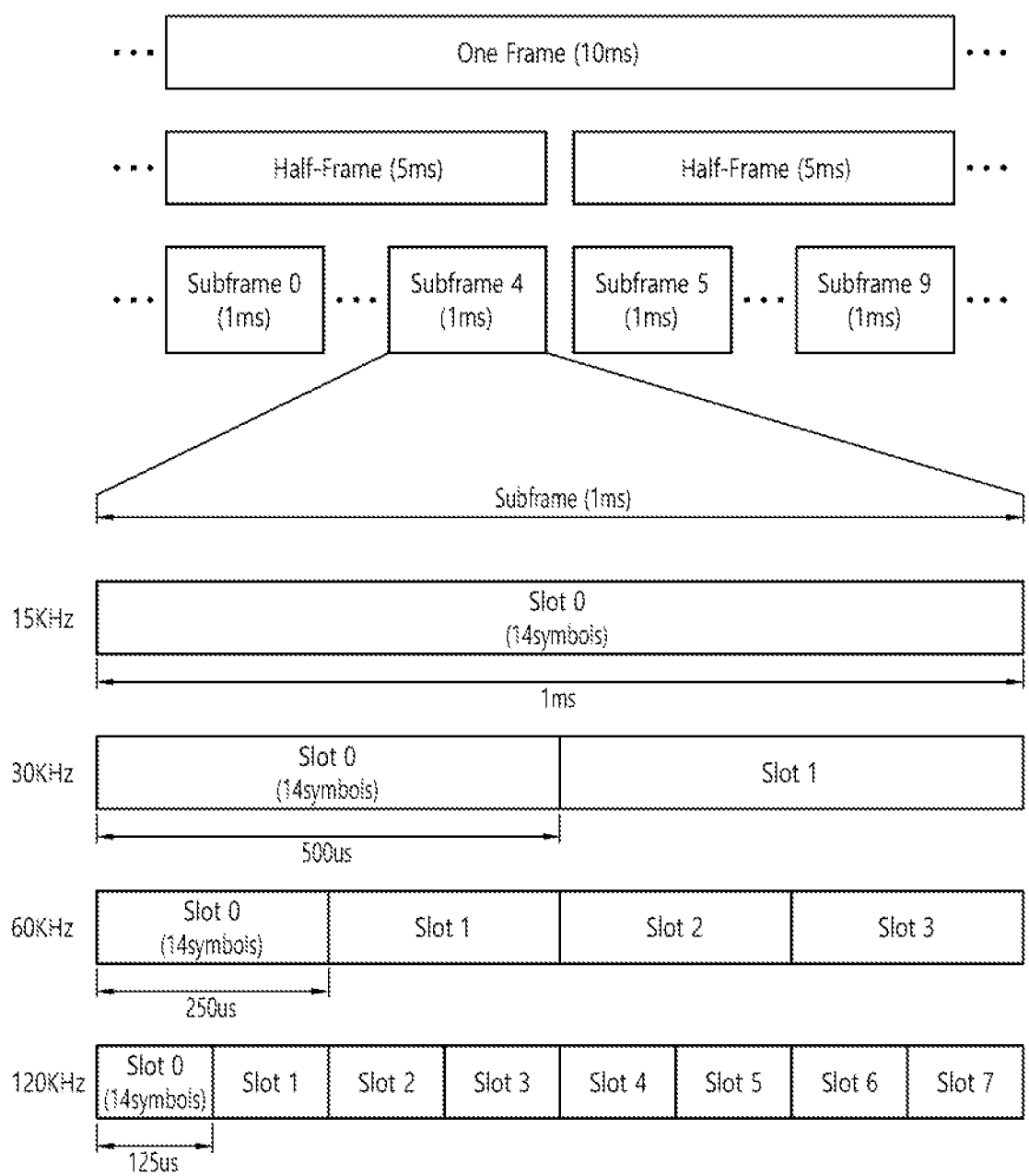
FIG. 7 shows a frame structure in a 3GPP based wireless communication system to which implementations of the present disclosure is applied.

FIG. 7 shows a frame structure in a 3GPP based wireless communication system to which implementations of the present disclosure is applied.

The frame structure shown in FIG. 7 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames.

Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 3 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 3

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 4 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 4

| u | $N^{slot}_{symb}$ | $N^{frame, u}_{slot}$ | $N^{subframe, u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB} N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports physical uplink control channel (PUCCH) transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 8:
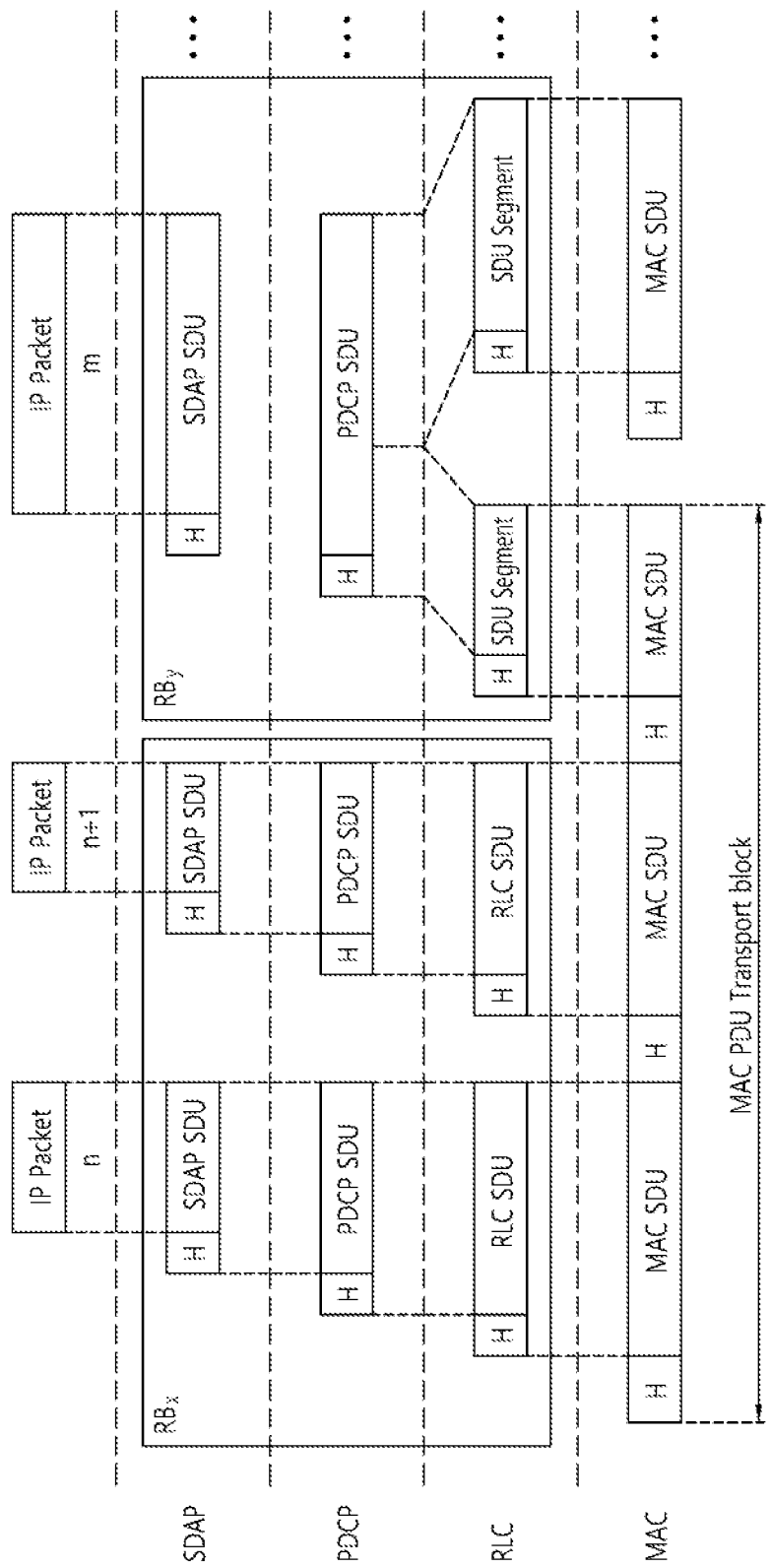
FIG. 8 shows a data flow example in the 3GPP NR system to which implementations of the present disclosure is applied.

FIG. 8 shows a data flow example in the 3GPP NR system to which implementations of the present disclosure is applied.

Referring to FIG. 8, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Sidelink (SL) transmission and/or communication in 5G NR is described. Section 5.7 and Section 16.9 of 3GPP TS 38.300 V16.1.0 can be referred.

Figure 9:
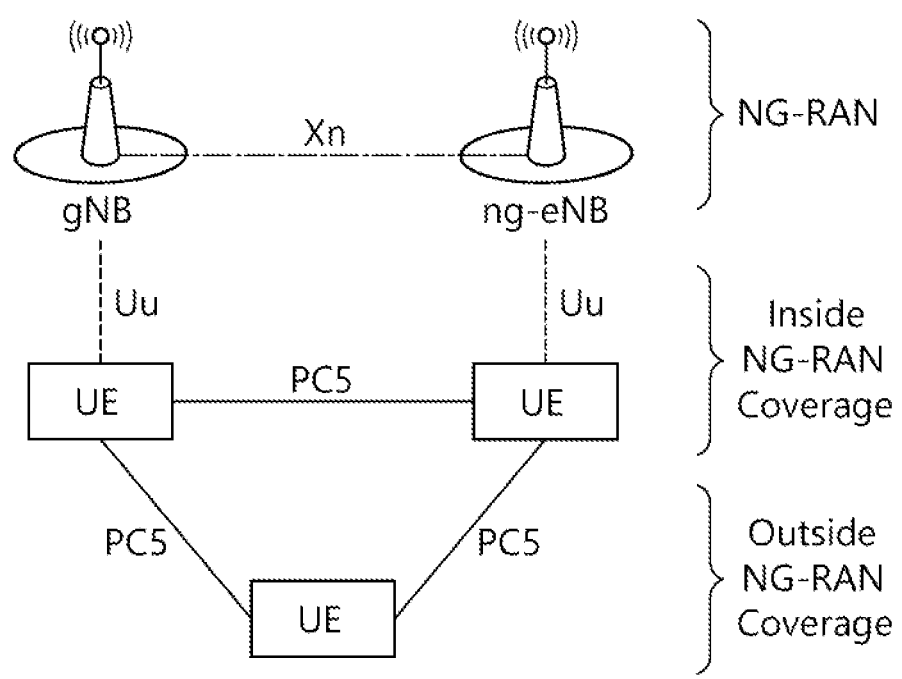
FIG. 9 shows an example of NG-RAN architecture supporting PC5 interface to which implementations of the present disclosure is applied.

FIG. 9 shows an example of NG-RAN architecture supporting PC5 interface to which implementations of the present disclosure is applied.

Referring to FIG. 9, sidelink transmission and reception over the PC5 interface are supported when the UE is inside NG-RAN coverage, irrespective of which RRC state the UE is in, and when the UE is outside NG-RAN coverage.

Support of V2X services via the PC5 interface can be provided by NR sidelink communication and/or V2X sidelink communication. NR sidelink communication may be used to support other services than V2X services.

NR sidelink communication can support one of three types of transmission modes for a pair of a Source Layer-2 ID and a Destination Layer-2 ID in the AS:

(1) Unicast transmission, characterized by:
   Support of one PC5-RRC connection between peer UEs for the pair;
   Transmission and reception of control information and user traffic between peer UEs in sidelink;
   Support of sidelink HARQ feedback;
   Support of RLC AM;
   Detection of radio link failure for the PC5-RRC connection.
(2) Groupcast transmission, characterized by:
   Transmission and reception of user traffic among UEs belonging to a group in sidelink;
   Support of sidelink HARQ feedback.
(3) Broadcast transmission, characterized by:
   Transmission and reception of user traffic among UEs in sidelink.

Two sidelink resource allocation modes are supported, i.e., mode 1 and mode 2. In mode 1, the sidelink resource allocation is provided by the network. In mode 2, UE decides the SL transmission resources and timing in the resource pool.

Mode 1, which may be called scheduled resource allocation, may be characterized by the following:
   The UE needs to be RRC_CONNECTED in order to transmit data;
   NG-RAN schedules transmission resources.

Mode 2, which may be called UE autonomous resource selection, may be characterized by the following:
   The UE can transmit data when inside NG-RAN coverage, irrespective of which RRC state the UE is in, and when outside NG-RAN coverage;
   The UE autonomously selects transmission resources from a pool of resources.

For NR sidelink communication, the UE performs sidelink transmissions only on a single carrier.

In mode 1, NG-RAN can dynamically allocate resources to the UE via the sidelink radio network temporary identifier (SL-RNTI) on PDCCH(s) for NR sidelink communication.

In addition, NG-RAN can allocate sidelink resources to UE with two types of configured sidelink grants:
   With type 1, RRC directly provides the configured sidelink grant only for NR sidelink communication;
   With type 2, RRC defines the periodicity of the configured sidelink grant while PDCCH can either signal and activate the configured sidelink grant, or deactivate it. The PDCCH is addressed to SL configured scheduling RNTI (SL-CS-RNTI) for NR sidelink communication and SL semi-persistent scheduling V-RNTI for V2X sidelink communication.

For the UE performing NR sidelink communication, there can be more than one configured sidelink grant activated at a time on the carrier configured for sidelink transmission.

When beam failure or physical layer problem occurs on NR Uu, the UE can continue using the configured sidelink grant type 1. During handover, the UE can be provided with configured sidelink grants via handover command, regardless of the type. If provided, the UE activates the configured sidelink grant type 1 upon reception of the handover command.

The UE can send sidelink buffer status report (SL BSR) to support scheduler operation in NG-RAN. The sidelink buffer status reports refer to the data that is buffered in for a group of logical channels (LCG) per destination in the UE. Eight LCGs are used for reporting of the sidelink buffer status reports. Two formats, which are SL BSR and truncated SL BSR, are used.

In mode 2, the UE autonomously selects sidelink grant from a pool of resources provided by broadcast system information or dedicated signalling while inside NG-RAN coverage or by pre-configuration while outside NG-RAN coverage.

For NR sidelink communication, the pools of resources can be provided for a given validity area where the UE does not need to acquire a new pool of resources while moving within the validity area, at least when this pool is provided by system information block (SIB) (e.g. reuse valid area of NR SIB). NR SIB validity mechanism is reused to enable validity area for SL resource pool configured via broadcasted system information.

The UE is allowed to temporarily use UE autonomous resource selection with random selection for sidelink transmission based on configuration of the exceptional transmission resource pool.

When a UE is inside NG-RAN coverage, NR sidelink communication and/or V2X sidelink communication can be configured and controlled by NG-RAN via dedicated signalling or system information:
   The UE should support and be authorized to perform NR sidelink communication and/or V2X sidelink communication in NG-RAN;
   If configured, the UE performs V2X sidelink communication unless otherwise specified;
   NG-RAN can provide the UE with intra-carrier sidelink configuration, inter-carrier sidelink configuration and anchor carrier which provides sidelink configuration via a Uu carrier for NR sidelink communication and/or V2X Sidelink communication;
   When the UE cannot simultaneously perform both NR sidelink transmission and NR uplink transmission in time domain, prioritization between both transmissions is done based on their priorities and thresholds configured by the NG-RAN.

When a UE is outside NG-RAN coverage, SLRB configuration are preconfigured to the UE for NR sidelink communication.

The UE in RRC_CONNECTED performs NR sidelink communication and/or V2X sidelink communication. The UE sends Sidelink UE Information to NG-RAN in order to request or release sidelink resources and report QoS information for each destination.

NG-RAN provides RRCReconfiguration to the UE in order to provide the UE with dedicated sidelink configuration. The RRCReconfiguration may include SLRB configuration for NR sidelink communication as well as either sidelink scheduling configuration or resource pool configuration. If UE has received SLRB configuration via system information, UE should continue using the configuration to perform sidelink data transmissions and receptions until a new configuration is received via the RRCReconfiguration.

NG-RAN may also configure measurement and reporting of channel busy ratio (CBR) and reporting of location information to the UE via RRCReconfiguration.

During handover, the UE performs sidelink transmission and reception based on configuration of the exceptional transmission resource pool or configured sidelink grant type 1 and reception resource pool of the target cell as provided in the handover command.

The UE in RRC_IDLE or RRC_INACTIVE performs NR sidelink communication and/or V2X sidelink communication. NG-RAN may provide common sidelink configuration to the UE in RRC_IDLE or RRC_INACTIVE via system information for NR sidelink communication and/or V2X sidelink communication. UE receives resource pool configuration and SLRB configuration via SIB12 for NR sidelink communication, and/or resource pool configuration via SIB13 and SIB14 for V2X sidelink communication. If UE has received SLRB configuration via dedicated signalling, UE should continue using the configuration to perform sidelink data transmissions and receptions until a new configuration is received via system information.

When the UE performs cell reselection, the UE interested in V2X service(s) considers at least whether NR sidelink communication and/or V2X sidelink communication are supported by the cell. The UE may consider the following carrier frequency as the highest priority frequency, except for the carrier only providing the anchor carrier:
 the frequency providing both NR sidelink communication and V2X sidelink communication, if configured to perform both NR sidelink communication and V2X sidelink communication;
 the frequency providing NR sidelink communication, if configured to perform only NR sidelink communication.

Radio protocol architecture for NR sidelink communication may be as follows.
 The AS protocol stack for the control plane in the PC5 interface consists of RRC, PDCP, RLC and MAC sublayers, and the physical layer.
 For support of PC5-S protocol, PC5-S is located on top of PDCP, RLC and MAC sublayers, and the physical layer for the control plane in the PC5 interface.
 The AS protocol stack for SBCCH in the PC5 interface consists of RRC, RLC, MAC sublayers, and the physical layer.
 The AS protocol stack for user plane in the PC5 interface consists of SDAP, PDCP, RLC and MAC sublayers, and the physical layer.

Sidelink Radio bearers (SLRB) are categorized into two groups: sidelink data radio bearers (SL DRB) for user plane data and sidelink signalling radio bearers (SL SRB) for control plane data. Separate SL SRBs using different SCCHs are configured for PC5-RRC and PC5-S signaling respectively.

Physical sidelink control channel (PSCCH) indicates resource and other transmission parameters used by a UE for PSSCH. PSCCH transmission is associated with a demodulation reference signal (DM-RS).

Physical sidelink shared channel (PSSCH) transmits the TBs of data themselves, and control information for HARQ procedures and channel state information (CSI) feedback triggers, etc. At least 5 OFDM symbols within a slot are used for PSSCH transmission. PSSCH transmission is associated with a DM-RS and may be associated with a phase tracking reference signal (PT-RS).

Physical sidelink feedback channel (PSFCH) carries HARQ feedback over the sidelink from a UE which is an intended recipient of a PSSCH transmission to the UE which performed the transmission. PSFCH sequence is transmitted in one PRB repeated over two OFDM symbols near the end of the sidelink resource in a slot.

The sidelink synchronization signal consists of sidelink primary and sidelink secondary synchronization signals (S-PSS, S-SSS), each occupying 2 symbols and 127 subcarriers. Physical sidelink broadcast channel (PSBCH) occupies 7 and 5 symbols for normal and extended cyclic prefix cases respectively, including the associated DM-RS.

Sidelink HARQ feedback uses PSFCH and can be operated in one of two options. In one option, PSFCH transmits either acknowledgement (ACK) or negative ACK (NACK) using a resource dedicated to a single PSFCH transmitting UE. In another option, PSFCH transmits NACK, or no PSFCH signal is transmitted, on a resource that can be shared by multiple PSFCH transmitting UEs.

In sidelink resource allocation mode 1, a UE which received PSFCH can report sidelink HARQ feedback to gNB via PUCCH or PUSCH.

For unicast, CSI reference signal (CSI-RS) is supported for CSI measurement and reporting in sidelink. A CSI report is carried in a MAC control element (CE).

The MAC sublayer provides the following services and functions over the PC5 interface in addition to the services and functions described above by referring to FIGS. 5 and 6.
 Radio resource selection;
 Packet filtering;
 Priority handling between uplink and sidelink transmissions for a given UE;
 Sidelink CSI reporting.

With logical channel prioritization (LCP) restrictions in MAC, only sidelink logical channels belonging to the same destination can be multiplexed into a MAC PDU for every unicast, groupcast and broadcast transmission which is associated to the destination. NG-RAN can also control whether a sidelink logical channel can utilize the resources allocated to a configured sidelink grant type 1.

For packet filtering, a SL-SCH MAC header including portions of both Source Layer-2 ID and a Destination Layer-2 ID is added to each MAC PDU. Logical channel ID (LCID) included within a MAC subheader uniquely identifies a logical channel within the scope of the Source Layer-2 ID and Destination Layer-2 ID combination.

The following logical channels are used in sidelink:
 Sidelink control channel (SCCH): a sidelink channel for transmitting control information from one UE to other UE(s);
 Sidelink traffic channel (STCH): a sidelink channel for transmitting user information from one UE to other UE(s);
 Sidelink broadcast control channel (SBCCH): a sidelink channel for broadcasting sidelink system information from one UE to other UE(s).

The following connections between logical channels and transport channels exist:
 SCCH can be mapped to sidelink shared channel (SL-SCH);
 STCH can be mapped to SL-SCH;
 SBCCH can be mapped to sidelink broadcast channel (SL-BCH).

The RRC sublayer provides the following services and functions over the PC5 interface:
 Transfer of a PC5-RRC message between peer UEs;
 Maintenance and release of a PC5-RRC connection between two UEs;
 Detection of sidelink radio link failure for a PC5-RRC connection.

A PC5-RRC connection is a logical connection between two UEs for a pair of Source and Destination Layer-2 IDs which is considered to be established after a corresponding PC5 unicast link is established. There is one-to-one correspondence between the PC5-RRC connection and the PC5 unicast link. A UE may have multiple PC5-RRC connections with one or more UEs for different pairs of Source and Destination Layer-2 IDs.

Separate PC5-RRC procedures and messages are used for a UE to transfer UE capability and sidelink configuration including SLRB configuration to the peer UE. Both peer UEs can exchange their own UE capability and sidelink configuration using separate bi-directional procedures in both sidelink directions.

If it is not interested in sidelink transmission, if sidelink radio link failure (RLF) on the PC5-RRC connection is declared, or if the Layer-2 link release procedure is completed or if the T400 is expired, UE releases the PC5-RRC connection.

Sidelink resource allocation is described in detail. If the TX UE is in RRC_CONNECTED and configured for gNB scheduled sidelink resource allocation (e.g., mode 1), the TX UE may transmit sidelink UE information including traffic pattern of Service, TX carriers and/or RX carriers mapped to service, QoS information related to service (e.g. 5QI, ProSe-per-packet priority (PPPP), ProSe-per-packet reliability (PPPR), QoS class identifier (QCI) value), and destination related to service.

After receiving the sidelink UE information, the gNB constructs sidelink configuration at least including one or more resource pools for service and sidelink buffer status reporting (BSR) configuration. The gNB signals the sidelink configuration to the TX UE and then the TX UE configures lower layers with sidelink configuration.

If a message becomes available in L2 buffer for sidelink transmission, the TX UE triggers scheduling request (SR), so that the TX UE transmits PUCCH resource. If PUCCH resource is not configured, the TX UE performs random access procedure as the SR. If an uplink grant is given at a result of the SR, the TX UE transmits sidelink BSR to the gNB. The sidelink BSR indicates at least a destination index, a logical channel group (LCG), and a buffer size corresponding to the destination.

After receiving the sidelink BSR, the gNB transmits a sidelink grant to the TX UE, e.g., by sending downlink control information (DCI) in PDCCH. The DCI may include an allocated sidelink resource. If the TX UE receives the DCI, the TX UE uses the sidelink grant for transmission to the RX UE.

Alternatively, if the TX UE is configured for UE autonomous scheduling of sidelink resource allocation (e.g., mode 2) regardless of RRC state, the TX UE autonomously select or reselect sidelink resources to create a sidelink grant used for transmission to the RX UE.

SL-SCH data transmission is described. Section 5.22.1 of 3GPP TS 38.321 V16.0.0 can be referred.

Sidelink grant is received dynamically on the PDCCH, configured semi-persistently by RRC or autonomously selected by the MAC entity. The MAC entity shall have a sidelink grant on an active SL BWP to determine a set of PSCCH duration(s) in which transmission of SCI occurs and a set of PSSCH duration(s) in which transmission of SL-SCH associated with the SCI occurs.

If the MAC entity has been configured by RRC to transmit using a SL-RNTI or

SLCS-RNTI, the MAC entity shall for each PDCCH occasion and for each grant received for this PDCCH occasion:

1> if a sidelink grant has been received on the PDCCH for the MAC entity's SL-RNTI:
2> if the NDI received on the PDCCH has been not toggled compared to the value in the previously received HARQ information for the HARQ Process ID:
3> use the received sidelink grant to determine PSCCH duration(s) and PSSCH duration(s) for one or more retransmissions of a single MAC PDU for the corresponding Sidelink process.
2> else:
3> use the received sidelink grant to determine PSCCH duration(s) and PSSCH duration(s) for initial transmission and, if available, retransmission(s) of a single MAC PDU.
2> consider the received sidelink grant to be a configured sidelink grant;
2> if a configured sidelink grant is available for retransmission(s) of a MAC PDU which has been positively acknowledged:
3> clear the PSCCH duration(s) and PSSCH duration(s) corresponding to retransmission(s) of the MAC PDU from the configured sidelink grant.
1> else if a sidelink grant has been received on the PDCCH for the MAC entity's SLCS-RNTI:
2> if PDCCH contents indicate retransmission(s) for an activated configured sidelink grant:
3> use the received sidelink grant to determine PSCCH duration(s) and PSSCH duration(s) for one or more retransmissions of a single MAC PDU.
2> else if PDCCH contents indicate configured grant Type 2 deactivation for a configured sidelink grant:
3> clear the configured sidelink grant, if available;
3> trigger configured sidelink grant confirmation for the configured sidelink grant.
2> else if PDCCH contents indicate configured grant Type 2 activation for a configured sidelink grant:
3> trigger configured sidelink grant confirmation for the configured sidelink grant;
3> store the configured sidelink grant;
3> initialise or re-initialise the configured sidelink grant to determine the set of PSCCH durations and the set of PSSCH durations for transmissions of multiple MAC PDUs.

If the MAC entity has been configured by RRC to transmit using pool(s) of resources in a carrier based on sensing or random selection, the MAC entity shall for each Sidelink process:

If the MAC entity has been configured by RRC to transmit using SL-RNTI or SLCS-RNTI but is configured by RRC to transmit using a pool of resources in a carrier, the MAC entity can create a configured sidelink grant on the pool of resources only after releasing other configured sidelink grant(s), if any.

1> if the MAC entity has selected to create a configured sidelink grant corresponding to transmissions of multiple MAC PDUs, and SL data is available in a logical channel:
2> perform the TX resource (re-)selection check;

The MAC entity continuously performs the TX resource (re-)selection check until the corresponding pool of resources is released by RRC or the MAC entity decides to cancel creating a configured sidelink grant corresponding to transmissions of multiple MAC PDUs.

2> if the TX resource (re-)selection is triggered as the result of the TX resource (re-) selection check:
3> select one of the allowed values configured by RRC in sl-ResourceReservePeriodList and set the resource reservation interval with the selected value;
3> randomly select, with equal probability, an integer value in the interval [5, 15] for the resource reservation interval higher than or equal to 100 ms and set SL_RESOURCE_RESELECTION_COUNTER to the selected value;
3> select the number of HARQ retransmissions from the allowed numbers that are configured by RRC in sl-MaxTxTransNumPSSCH included in sl-PSSCH-TxConfigList and, if configured by upper layers, overlapped in sl-MaxTxTransNumPSSCH indicated in sl-CBR-PSSCH-TxConfigList for the highest priority of the logical channel(s) allowed on the carrier and the CBR measured by lower layers if CBR measurement results are available or the corresponding sl-defaultTxConfigIndex configured by RRC if CBR measurement results are not available;
3> select an amount of frequency resources within the range that is configured by RRC between sl-MinSubChannelNumPSSCH and sl-MaxSubchannelNumPSSCH included in sl-PSSCH-TxConfigList and, if configured by RRC, overlapped between MinSubChannelNumPSSCH and MaxSubchannelNumPSSCH indicated in sl-CBR-PSSCH-TxConfigList for the highest priority of the logical channel(s) allowed on the carrier and the CBR measured by lower layers if CBR measurement results are available or the corresponding sl-defaultTxConfigIndex configured by RRC if CBR measurement results are not available;
3> randomly select the time and frequency resources for one transmission opportunity from the resources indicated by the physical layer, according to the amount of selected frequency resources and the remaining PDB of SL data available in the logical channel(s) allowed on the carrier.
3> use the randomly selected resource to select a set of periodic resources spaced by the resource reservation interval for transmissions of PSCCH and PSSCH corresponding to the number of transmission opportunities of MAC PDUs;
3> if one or more HARQ retransmissions are selected:
4> if there are available resources left in the resources indicated by the physical layer for more transmission opportunities:
5> randomly select the time and frequency resources for one or more transmission opportunities from the available resources, according to the amount of selected frequency resources, the selected number of HARQ retransmissions and the remaining PDB of SL data available in the logical channel(s) allowed on the carrier;
5> use the randomly selected resource to select a set of periodic resources spaced by the resource reservation interval for transmissions of PSCCH and PSSCH corresponding to the number of retransmission opportunities of the MAC PDUs;
5> consider the first set of transmission opportunities as the new transmission opportunities and the other set of transmission opportunities as the retransmission opportunities;
5> consider the set of new transmission opportunities and retransmission opportunities as the selected sidelink grant.

3> else:
4> consider the set as the selected sidelink grant.
3> use the selected sidelink grant to determine the set of PSCCH durations and the set of PSSCH durations;
3> consider the selected sidelink grant to be a configured sidelink grant.
2> else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in sl-ProbResourceKeep:
3> clear the configured sidelink grant, if available;
3> randomly select, with equal probability, an integer value in the interval [5, 15] for the resource reservation interval higher than or equal to 100 ms and set SL_RESOURCE_RESELECTION_COUNTER to the selected value;
3> use the previously selected sidelink grant for the number of transmissions of the MAC PDUs with the resource reservation interval to determine the set of PSCCH durations and the set of PSSCH durations;
3> consider the selected sidelink grant to be a configured sidelink grant.
1> if the MAC entity has selected to create a configured sidelink grant corresponding to transmission(s) of a single MAC PDU, and if SL data is available in a logical channel or a SL-CSI reporting is triggered:
2> perform the TX resource (re-)selection check;
2> if the TX resource (re-)selection is triggered as the result of the TX resource (re-) selection check:
3> select the number of HARQ retransmissions from the allowed numbers that are configured by RRC in sl-MaxTxTransNumPSSCH included in sl-PSSCH-TxConfigList and, if configured by RRC, overlapped in sl-MaxTxTransNumPSSCH indicated in sl-CBR-PSSCH-TxConfigList for the highest priority of the logical channel(s) allowed on the carrier and the CBR measured by lower layers if CBR measurement results are available or the corresponding sl-defaultTxConfigIndex configured by RRC if CBR measurement results are not available;
3> select an amount of frequency resources within the range that is configured by RRC between sl-MinSubChannelNumPSSCH and sl-MaxSubChannelNumPSSCH included in sl-PSSCH-TxConfigList and, if configured by RRC, overlapped between sl-MinSubChannelNumPSSCH and sl-MaxSubChannelNumPSSCH indicated in sl-CBR-PSSCH-TxConfigList for the highest priority of the logical channel(s) allowed on the carrier and the CBR measured by lower layers if CBR measurement results are available or the corresponding sl-defaultTxConfigIndex configured by RRC if CBR measurement results are not available;
3> randomly select the time and frequency resources for one transmission opportunity from the resources indicated by the physical layer, according to the amount of selected frequency resources and the remaining PDB of SL data available in the logical channel(s) allowed on the carrier;
3> if one or more HARQ retransmissions are selected:
4> if there are available resources left in the resources indicated by the physical layer for more transmission opportunities:
5> randomly select the time and frequency resources for one or more transmission opportunities from the available resources, according to the amount of selected frequency resources, the selected number of HARQ retransmissions and the remaining PDB of SL data available in the logical channel(s) allowed on the carrier;
5> consider a transmission opportunity which comes first in time as the new transmission opportunity and a transmission opportunity which comes later in time as the retransmission opportunity;
5> consider both of the transmission opportunities as the selected sidelink grant;
3> else:
4> consider the set as the selected sidelink grant;
3> use the selected sidelink grant to determine PSCCH duration(s) and PSSCH duration(s);
3> consider the selected sidelink grant to be a configured sidelink grant.
1> if a configured sidelink grant is available for retransmission(s) of a MAC PDU which has been positively acknowledged:
2> clear the PSCCH duration(s) and PSSCH duration(s) corresponding to retransmission(s) of the MAC PDU from the configured sidelink grant.

The MAC entity shall for each PSSCH duration:
1> for each configured sidelink grant occurring in this PSSCH duration:
2> if the MAC entity has been configured by RRC to transmit using a SL-RNTI or SLCS-RNTI:
3> select a MCS which is, if configured, within the range that is configured by RRC between sl-MinMCS-PSSCH and sl-MaxMCS-PSSCH included in SL-ScheduledConfig.
2> else:
3> select a MCS which is, if configured, within the range that is configured by RRC between sl-MinMCS-PSSCH and sl-MaxMCS-PSSCH included in sl-PSSCH-TxConfigList and, if configured by RRC, overlapped between sl-MinMCS-PSSCH and sl-MaxMCS-PSSCH indicated in sl-CBR-PSSCH-TxConfigList for the highest priority of the sidelink logical channel(s) in the MAC PDU and the CBR measured by RRC if CBR measurement results are available or the corresponding sl-defaultTxConfigIndex configured by RRC if CBR measurement results are not available.
2> deliver the sidelink grant, the selected MCS, and the associated HARQ information to the Sidelink HARQ Entity for this PSSCH duration.

If the TX resource (re-)selection check procedure is triggered for a Sidelink process, the MAC entity shall for the Sidelink process:
1> if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in sl-ProbResource-Keep; or
1> if a pool of resources is configured or reconfigured by upper layers; or
1> if there is no configured sidelink grant; or
1> if neither transmission nor retransmission has been performed by the MAC entity on any resource indicated in the configured sidelink grant during the last [second]; or
1> if sl-ReselectAfter is configured and the number of consecutive unused transmission opportunities on resources indicated in the configured sidelink grant is equal to sl-ReselectAfter; or
1> if the configured sidelink grant cannot accommodate a RLC SDU by using the maximum allowed MCS configured by upper layers in sl-MaxMCS-PSSCH and the MAC entity selects not to segment the RLC SDU; or
1> if transmission(s) with the configured sidelink grant cannot fulfil the latency requirement of the data in a logical channel according to the associated priority, and the MAC entity selects not to perform transmission(s) corresponding to a single MAC PDU; or
1> if a sidelink transmission is scheduled by any received SCI indicating a higher priority than the priority of the logical channel and expected to overlap with a resource of the configured sidelink grant, and a measured result on SL-RSRP associated with the sidelink transmission is higher than [threshold]:
2> clear the configured sidelink grant associated to the Sidelink process, if available;
2> trigger the TX resource (re-)selection.

The MAC entity includes at most one Sidelink HARQ entity for transmission on SL-SCH, which maintains a number of parallel Sidelink processes.

A sidelink process may be configured for transmissions of multiple MAC PDUs.

A delivered sidelink grant and its associated Sidelink transmission information are associated with a Sidelink process. Each Sidelink process supports one TB.

For each sidelink grant, the Sidelink HARQ Entity shall:
1> if the MAC entity determines that the sidelink grant is used for initial transmission; and
1> if no MAC PDU has been obtained:
2> associate a Sidelink process to this grant, and for each associated Sidelink process:
3> obtain the MAC PDU to transmit from the Multiplexing and assembly entity, if any;
3> if a MAC PDU to transmit has been obtained:
4> determines Sidelink transmission information of the TB for the source and destination pair of the MAC PDU as follows:
5> set the Source Layer-1 ID to the 16 MSB of the Source Layer-2 ID of the MAC PDU;
5> set the Destination Layer-1 ID to the 8 MSB of the Destination Layer-2 ID of the MAC PDU;
5> consider the NDI to have been toggled and set the NDI to the toggled value;
5> associate the Sidelink process to a Sidelink process ID;
5> enable HARQ feedback, if sl-HARQ-FeedbackEnabled has been set to Enabled for the logical channel(s) in the MAC PDU;
5> set the priority to the value of the highest priority of the logical channel(s) and a MAC CE, if any, if included, in the MAC PDU;
5> set the communication range to the value of the longest communication range of the logical channel(s) in the MAC PDU, if configured;
5> set the location information to the Zone_id, if configured.
4> deliver the MAC PDU, the sidelink grant and the Sidelink transmission information of the TB to the associated Sidelink process;
4> instruct the associated Sidelink process to trigger a new transmission.
3> else:
4> flush the HARQ buffer of the associated Sidelink process.

1> else (i.e. retransmission):
2> identify the Sidelink process associated with this grant, and for each associated Sidelink process:
3> if sl-MaxTransNum corresponding to the highest priority of the logical channel(s) in the MAC PDU has been configured in sl-CG-MaxTransNumList for the sidelink grant by RRC and the maximum number of transmissions of the MAC PDU has been reached to sl-MaxTransNum; or
3> if a positive acknowledgement to a transmission of the MAC PDU has been received; or
1> if only a negative acknowledgement was enabled in the SCI and no negative acknowledgement was received prioritized, and the sidelink transmission is prioritized over uplink transmission:
2> instruct the physical layer to transmit SCI according to the stored sidelink grant with the associated Sidelink transmission information;
2> instruct the physical layer to generate a transmission according to the stored sidelink grant;
2> if sl-HARQ-FeedbackEnabled has been set to enabled for the logical channel(s) in the MAC PDU:
3> instructs the physical layer to monitor PSFCH for the transmission.
1> if this transmission corresponds to the last transmission of the MAC PDU:
2> decrement SL_RESOURCE_RESELECTION_COUNTER by 1, if available.

The transmission of the MAC PDU is prioritized over uplink transmissions of the MAC entity or the other MAC entity if the following conditions are met:
1> if the MAC entity is not able to perform this sidelink transmission simultaneously with all uplink transmissions at the time of the transmission, and
1> if uplink transmission is neither prioritized nor prioritized by upper layer; and
1> if the value of the highest priority of logical channel(s) and a MAC CE in the MAC PDU is lower than sl-PrioritizationThres if sl-PrioritizationThres is configured.

The MAC entity shall for each PSSCH transmission:
1> if an acknowledgement corresponding to the transmission is obtained from the physical layer:
2> deliver the acknowledgement to the corresponding Sidelink HARQ entity for the Sidelink process;
1> else:
2> deliver a negative acknowledgement to the corresponding Sidelink HARQ entity for the Sidelink process;
1> if sl-PUCCH-Config is configured by RRC:
2> instruct the physical layer to signal the acknowledgement corresponding to the transmission on the PUCCH.

SL-SCH data reception is described. Section 5.22.2 of 3GPP TS 38.321 V16.0.0 can be referred.

SCI indicate if there is a transmission on SL-SCH and provide the relevant HARQ information. A SCI consists of two parts: the $1^{st}$ stage SCI on PSCCH and the $2^{nd}$ stage SCI on PSSCH.

The MAC entity shall:
1> for each PSCCH duration during which the MAC entity monitors PSCCH:
2> if a $1^{st}$ stage SCI for this PSSCH duration has been received on the PSCCH:
3> determine the set of PSSCH durations in which reception of a $2^{nd}$ stage SCI and the transport block occur using the received part of the SCI;
3> if the $2^{nd}$ stage SCI for this PSSCH duration has been received on the PSSCH:
4> store the SCI as a valid SCI for the PSSCH durations corresponding to transmission(s) of the transport block and the associated HARQ information and QoS information;
1> for each PSSCH duration for which the MAC entity has a valid SCI:
2> deliver the SCI and the associated Sidelink transmission information to the Sidelink HARQ Entity.

There is at most one Sidelink HARQ Entity at the MAC entity for reception of the SL-SCH, which maintains a number of parallel Sidelink processes.

Each Sidelink process is associated with SCI in which the MAC entity is interested. This interest is as determined by the Destination Layer-1 ID and the Source Layer-1 ID of the SCI. The Sidelink HARQ Entity directs Sidelink transmission information and associated TBs received on the SL-SCH to the corresponding Sidelink processes.

For each PSSCH duration, the Sidelink HARQ Entity shall:
1> for each SCI valid for this PSSCH duration:
2> if the NDI has been toggled compared to the value of the previous received transmission corresponding to this TB or this is the very first received transmission for this TB:
3> allocate the TB received from the physical layer and the associated Sidelink transmission information to an unoccupied Sidelink process, associate the Sidelink process with this SCI and consider this transmission to be a new transmission.
1> for each Sidelink process:
2> if the NDI has been not toggled compared to the value of the previous received transmission corresponding to this TB for the Sidelink process according to its associated SCI:
3> allocate the TB received from the physical layer to the Sidelink process and consider this transmission to be a retransmission.
2> else if the HARQ buffer of the Sidelink process is not empty:
3> flush the HARQ buffer.

For each PSSCH duration where a transmission takes place for the Sidelink process, one TB and the associated HARQ information is received from the Sidelink HARQ Entity.

For each received TB and associated Sidelink transmission information, the Sidelink process shall:
1> if this is a new transmission:
2> attempt to decode the received data.
1> else if this is a retransmission:
2> if the data for this TB has not yet been successfully decoded:
3> instruct the physical layer to combine the received data with the data currently in the soft buffer for this TB and attempt to decode the combined data.
1> if the data which the MAC entity attempted to decode was successfully decoded for this TB; or
1> if the data for this TB was successfully decoded before:
2> if this is the first successful decoding of the data for this TB, if the SRC field of the decoded MAC PDU subheader is equal to the 16 MSB of any of the Source Layer-2 ID(s) of the UE for which the 8 LSB are equal to the Source ID in the corresponding SCI, and if the DST field of the decoded MAC PDU subheader is equal to the 8 MSB of any of the Destination Layer-2 ID(s)

of the UE for which the 16 LSB are equal to the Destination ID in the corresponding SCI:
3> deliver the decoded MAC PDU to the disassembly and demultiplexing entity;
3> consider the Sidelink process as unoccupied.
1> else:
2> instruct the physical layer to replace the data in the soft buffer for this TB with the data which the MAC entity attempted to decode.
1> if HARQ feedback is enabled by the SCI:
2> if HARQ feedback corresponding to this TB is configured with [a separate PSFCH resource]; or
2> if HARQ feedback corresponding to this TB is configured with [a shared PSFCH resource] and the communication range calculated with the location information of the associated Sidelink transmission information is smaller or equal to the communication range indicated in the associated Sidelink transmission:
3> instruct the physical layer to generate acknowledgement(s) of the data in this TB.

1. Implementation 1

In conventional sidelink (e.g., V2X) communication in LTE-A, sidelink HARQ feedback was not supported. In 5G NR, sidelink HARQ feedback is supported, and if resources for sidelink HARQ feedback (e.g., PSFCH resources) are configured only in certain resource pools, a problem may arise as to how resource pools should be selected for a logical channel with sidelink HARQ feedback enabled.

According to implementation 1 of the present disclosure, if at least one logical channel among one or more logical channels is enabled with sidelink HARQ feedback, if data to be transferred in one of the logical channels is available, and if no resource pool is selected for the one logical channel in which data is available, resource pools mapped to the one logical channel may be selected.

According to implementation 1 of the present disclosure, if sidelink HARQ feedback is enabled for the one logical channel in which data is available, a specific resource pool for which sidelink HARQ feedback resource is supported may be finally selected among the selected resource pools.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 10:
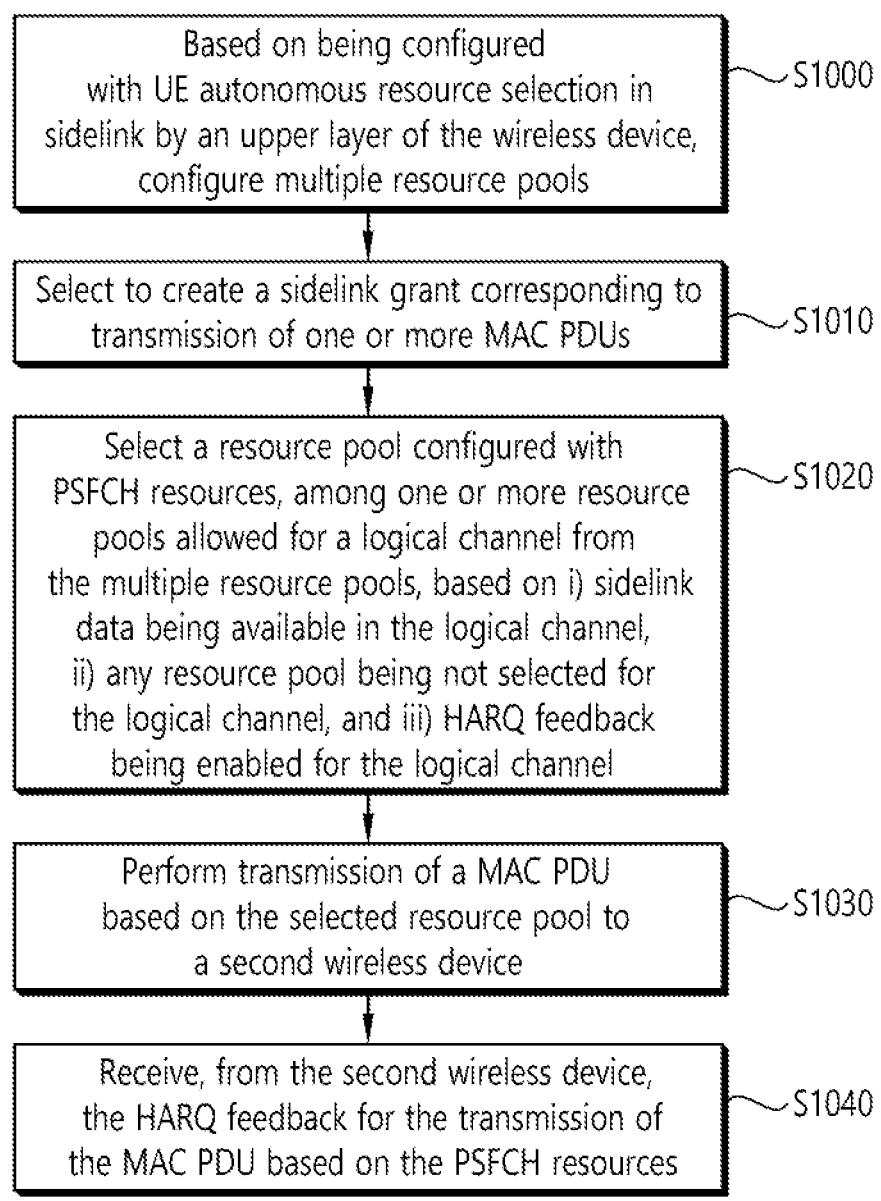
FIG. 10 shows an example of a method performed by a first wireless device to which implementation 1 of the present disclosure is applied.

FIG. 10 shows an example of a method performed by a first wireless device to which implementation 1 of the present disclosure is applied.

In step S1000, the method includes, based on being configured with UE autonomous resource selection in sidelink (e.g., mode 2) by an upper layer of the first wireless device, configuring multiple resource pools.

In some implementations, the UE autonomous resource selection may correspond to transmission using pool of resources in a carrier based on sensing or random selection.

In step S1010, the method includes selecting to create a sidelink grant corresponding to transmission of one or more MAC PDUs.

In step S1020, the method includes selecting a resource pool configured with PSFCH resources, among one or more resource pools allowed for a logical channel from the multiple resource pools, based on i) sidelink data being available in the logical channel, ii) any resource pool being not selected for the logical channel, and iii) HARQ feedback being enabled for the logical channel. That is, i) if sidelink data is available in a logical channel, ii) if any resource pool is not selected for the logical channel, and iii) if HARQ feedback is enabled for the logical channel, a resource pool configured with PSFCH resources is selected among one or more resource pools allowed for the logical channel from the multiple resource pools.

In some implementations, the resource pool may be selected with increasing order of CBR from a lowest CBR.

In some implementations, the one or more resource pools may be considered as candidate resource pools.

In some implementations, the method may further include selecting a resource pool not configured with the PSFCH resources, among one or more resource pools allowed for a logical channel from the multiple resource pools, based on the HARQ feedback being disable for the logical channel.

In step S1030, the method includes performing transmission of a MAC PDU based on the selected resource pool to a second wireless device.

In some implementations, the MAC PDU may be transmitted on a PSCCH.

In step S1040, the method includes receiving, from the second wireless device, the HARQ feedback for the transmission of the MAC PDU based on the PSFCH resources.

In some implementations, the PSFCH resources may be dedicated to the second wireless device. In this case, the HARQ feedback may be either an ACK or a NACK.

In some implementations, the PSFCH resources may be shared by multiple wireless devices including the second wireless device. In this case, the HARQ feedback may be an NACK.

In some implementations, the first wireless device may be in communication with at least one of a mobile device, a network, and/or autonomous vehicles other than the first wireless device.

According to implementation 1 of the present disclosure shown in FIG. 10, an example of operations of the MAC entity may be as follows.

If the MAC entity has been configured by RRC to transmit using pool(s) of resources in a carrier based on sensing or random selection, the MAC entity shall for each Sidelink process:
Note: If the MAC entity has been configured by RRC to transmit using SL-RNTI or
SLCS-RNTI but is configured by RRC to transmit using a pool of resources in a carrier, the MAC entity can create a configured sidelink grant on the pool of resources only after releasing other configured sidelink grant(s), if any.
1> if the MAC entity has selected to create a configured sidelink grant corresponding to transmissions of multiple MAC PDUs, and SL data is available in a logical channel:
2> perform the TX resource pool (re-)selection;
Regarding the TX resource pool (re-)selection, the MAC entity shall consider a CBR of a carrier to be one measured by lower layers if CBR measurement results are available, or the corresponding defaultTxConfigIndex configured by upper layers for the carrier if CBR measurement results are not available.
If the TX resource pool (re-)selection is triggered for a Sidelink process, the MAC entity shall:
1> if there is no configured sidelink grant on any resource pool allowed for the sidelink logical channel where data is available as indicated by RRC and upper layers:

2> for each resource pool configured by upper layers associated with the concerned sidelink logical channel:
3> if the CBR of the resource pool is below threshCBR-FreqReselection associated with the priority of the sidelink logical channel:
4> consider the resource pool as a candidate resource pool for TX resource pool (re-) selection for the concerned sidelink logical channel.
1> else:
2> for each sidelink logical channel, if any, where data is available and that are allowed on the resource pool for which Tx resource pool (re-)selection is triggered:
3> if the CBR of the resource pool is below threshCBR-FreqKeeping associated with priority of the sidelink logical channel:
4> select the resource pool.
3> else:
4> for each resource pool configured by upper layers on which the sidelink logical channel is allowed, if the CBR of the carrier is below threshCBR-FreqReselection associated with the priority of the sidelink logical channel;
5> consider the resource pool as a candidate resource pool for TX resource pool (re-) selection.

The MAC entity shall:
1> if one or more resource pools are considered as the candidate resource pools for TX resource pool (re-) selection:
2> for each sidelink logical channel allowed on the resource pool where data is available and Tx resource pool (re-)selection is triggered:
3> if sl-HARQ-FeedbackEnabled has been set to Enabled for at least one sidelink logical channel allowed on the resource pool wherein the sidelink logical channel has SL data:
4> select one or more resource pool(s) among the candidate resource pools with PSFCH resources with increasing order of CBR from the lowest CBR.
3> else:
4> select one or more resource pool(s) among the candidate resource pools without PSFCH resources with increasing order of CBR from the lowest CBR.

According to implementation 1 of the present disclosure shown in FIG. 10, another example of operations of the MAC entity may be as follows.

If the MAC entity has been configured with Sidelink resource allocation mode 2 to transmit using pool(s) of resources in a carrier based on sensing or random selection, the MAC entity shall for each Sidelink process:
1> if the MAC entity has selected to create a selected sidelink grant corresponding to transmissions of multiple MAC PDUs, and SL data is available in a logical channel:
2> if the MAC entity has not selected a pool of resources allowed for the logical channel:
3> if sl-HARQ-FeedbackEnabled is set to enabled for the logical channel:
4> select any pool of resources configured with PSFCH resources among the pools of resources;

Furthermore, the method in perspective of the first wireless device described above in FIG. 10 may be performed by the first wireless device 100 shown in FIG. 2, the wireless device 100 shown in FIG. 3, and/or the UE 100 shown in FIG. 4.

More specifically, the first wireless device comprises at least one transceiver, at least one processor, and at least one computer memory operably connectable to the at least one processor and storing instructions that, based on being executed by the at least one processor, perform operations below.

The first wireless device, based on being configured with UE autonomous resource selection in sidelink (e.g., mode 2) by an upper layer of the first wireless device, configures multiple resource pools.

In some implementations, the UE autonomous resource selection may correspond to transmission using pool of resources in a carrier based on sensing or random selection.

The first wireless device selects to create a sidelink grant corresponding to transmission of one or more MAC PDUs.

The first wireless device selects a resource pool configured with PSFCH resources, among one or more resource pools allowed for a logical channel from the multiple resource pools, based on i) sidelink data being available in the logical channel, ii) any resource pool being not selected for the logical channel, and iii) HARQ feedback being enabled for the logical channel. That is, i) if sidelink data is available in a logical channel, ii) if any resource pool is not selected for the logical channel, and iii) if HARQ feedback is enabled for the logical channel, a resource pool configured with PSFCH resources is selected among one or more resource pools allowed for the logical channel from the multiple resource pools.

In some implementations, the resource pool may be selected with increasing order of CBR from a lowest CBR.

In some implementations, the one or more resource pools may be considered as candidate resource pools.

In some implementations, the method may further include selecting a resource pool not configured with the PSFCH resources, among one or more resource pools allowed for a logical channel from the multiple resource pools, based on the HARQ feedback being disable for the logical channel.

The first wireless device performs transmission of a MAC PDU based on the selected resource pool to a second wireless device.

In some implementations, the MAC PDU may be transmitted on a PSCCH.

The first wireless device receive, from the second wireless device, the HARQ feedback for the transmission of the MAC PDU based on the PSFCH resources.

In some implementations, the PSFCH resources may be dedicated to the second wireless device. In this case, the HARQ feedback may be either an ACK or a NACK.

In some implementations, the PSFCH resources may be shared by multiple wireless devices including the second wireless device. In this case, the HARQ feedback may be an NACK.

Furthermore, the method in perspective of the first wireless device described above in FIG. 10 may be performed by control of the processor 102 included in the first wireless device 100 shown in FIG. 2, by control of the communication unit 110 and/or the control unit 120 included in the wireless device 100 shown in FIG. 3, and/or by control of the processor 102 included in the UE 100 shown in FIG. 4.

More specifically, an apparatus operating in a wireless communication system (e.g., first wireless device) comprises at least one processor, and at least one computer memory operably connectable to the at least one processor. The at least one processor is configured to perform operations comprising: based on being configured with UE autonomous resource selection in sidelink by an upper layer, configuring multiple resource pools, selecting to create a sidelink grant corresponding to transmission of one or more MAC PDUs, and selecting a resource pool configured with PSFCH resources, among one or more resource pools allowed for a logical channel from the multiple resource pools, based on i) sidelink data being available in the logical channel, ii) any resource pool being not selected for the logical channel, and iii) HARQ feedback being enabled for the logical channel.

Furthermore, the method in perspective of the first wireless device described above in FIG. 10 may be performed by a software code 105 stored in the memory 104 included in the first wireless device 100 shown in FIG. 2.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM), ROM, non-volatile random access memory (NVRAM), EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically, at least one CRM stores instructions that, based on being executed by at least one processor, perform operations comprising: based on being configured with UE autonomous resource selection in sidelink by an upper layer, configuring multiple resource pools, selecting to create a sidelink grant corresponding to transmission of one or more MAC PDUs, and selecting a resource pool configured with PSFCH resources, among one or more resource pools allowed for a logical channel from the multiple resource pools, based on i) sidelink data being available in the logical channel, ii) any resource pool being not selected for the logical channel, and iii) HARQ feedback being enabled for the logical channel.

Figure 11:
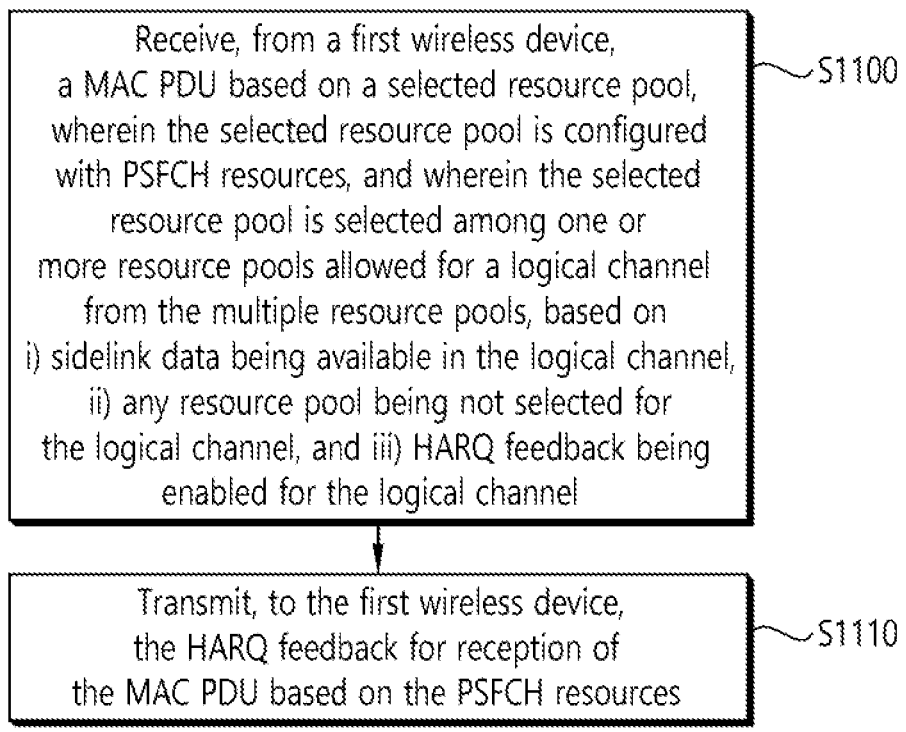
FIG. 11 shows an example of a method performed by a second wireless device to which implementation 1 of the present disclosure is applied.

FIG. 11 shows an example of a method performed by a second wireless device to which implementation 1 of the present disclosure is applied.

In step S1100, the method includes receiving, from a first wireless device, a MAC PDU based on a selected resource pool.

The selected resource pool is configured with PSFCH resources.

The selected resource pool is selected among one or more resource pools allowed for a logical channel from multiple resource pools, based on i) sidelink data being available in the logical channel, ii) any resource pool being not selected for the logical channel, and iii) HARQ feedback being enabled for the logical channel.

In step S1110, the method includes transmitting, to the first wireless device, the HARQ feedback for reception of the MAC PDU based on the PSFCH resources.

Furthermore, the method in perspective of the second wireless device described above in FIG. 11 may be performed by the second wireless device 200 shown in FIG. 2 and/or the wireless device 200 shown in FIG. 3.

More specifically, the second wireless device comprises at least one transceiver, at least one processor, and at least one computer memory operably connectable to the at least one processor and storing instructions that, based on being executed by the at least one processor, perform operations below.

The second wireless device receives, from a first wireless device, a MAC PDU based on a selected resource pool.

The selected resource pool is configured with PSFCH resources.

The selected resource pool is selected among one or more resource pools allowed for a logical channel from multiple resource pools, based on i) sidelink data being available in the logical channel, ii) any resource pool being not selected for the logical channel, and iii) HARQ feedback being enabled for the logical channel.

The second wireless device transmits, to the first wireless device, the HARQ feedback for reception of the MAC PDU based on the PSFCH resources.

Furthermore, the method in perspective of the second wireless device described above in FIG. 11 may be performed by control of the processor 202 included in the second wireless device 200 shown in FIG. 2, by control of the communication unit 110 and/or the control unit 120 included in the wireless device 100 shown in FIG. 3, and/or by control of the processor 102 included in the UE 100 shown in FIG. 4.

More specifically, an apparatus operating in a wireless communication system (e.g., second wireless device) comprises at least one processor, and at least one computer memory operably connectable to the at least one processor. The at least one processor is configured to perform operations comprising: obtaining a MAC PDU based on a selected resource pool, wherein the selected resource pool is configured with PSFCH resources, and wherein the selected resource pool is selected among one or more resource pools allowed for a logical channel from multiple resource pools, based on i) sidelink data being available in the logical channel, ii) any resource pool being not selected for the logical channel, and iii) HARQ feedback being enabled for the logical channel, and generating the HARQ feedback for reception of the MAC PDU based on the PSFCH resources.

Furthermore, the method in perspective of the second wireless device described above in FIG. 11 may be performed by a software code 205 stored in the memory 204 included in the second wireless device 200 shown in FIG. 2.

More specifically, at least one CRM stores instructions that, based on being executed by at least one processor, perform operations comprising: obtaining a MAC PDU based on a selected resource pool, wherein the selected resource pool is configured with PSFCH resources, and wherein the selected resource pool is selected among one or more resource pools allowed for a logical channel from multiple resource pools, based on i) sidelink data being available in the logical channel, ii) any resource pool being not selected for the logical channel, and iii) HARQ feedback being enabled for the logical channel, and generating the HARQ feedback for reception of the MAC PDU based on the PSFCH resources.

According to implementation 1 of the present disclosure, if PSFCH resources are only configured in certain resource pools, a resource pool can be effectively selected for a logical channel with sidelink HARQ feedback enabled.

2. Implementation 2

When UE receives PDCCH activating and/or deactivating UL or SL configured grant, UE sends configured grant confirmation MAC CE to the network. However, this MAC CE transmission may collide with other transmission.

Figure 12:
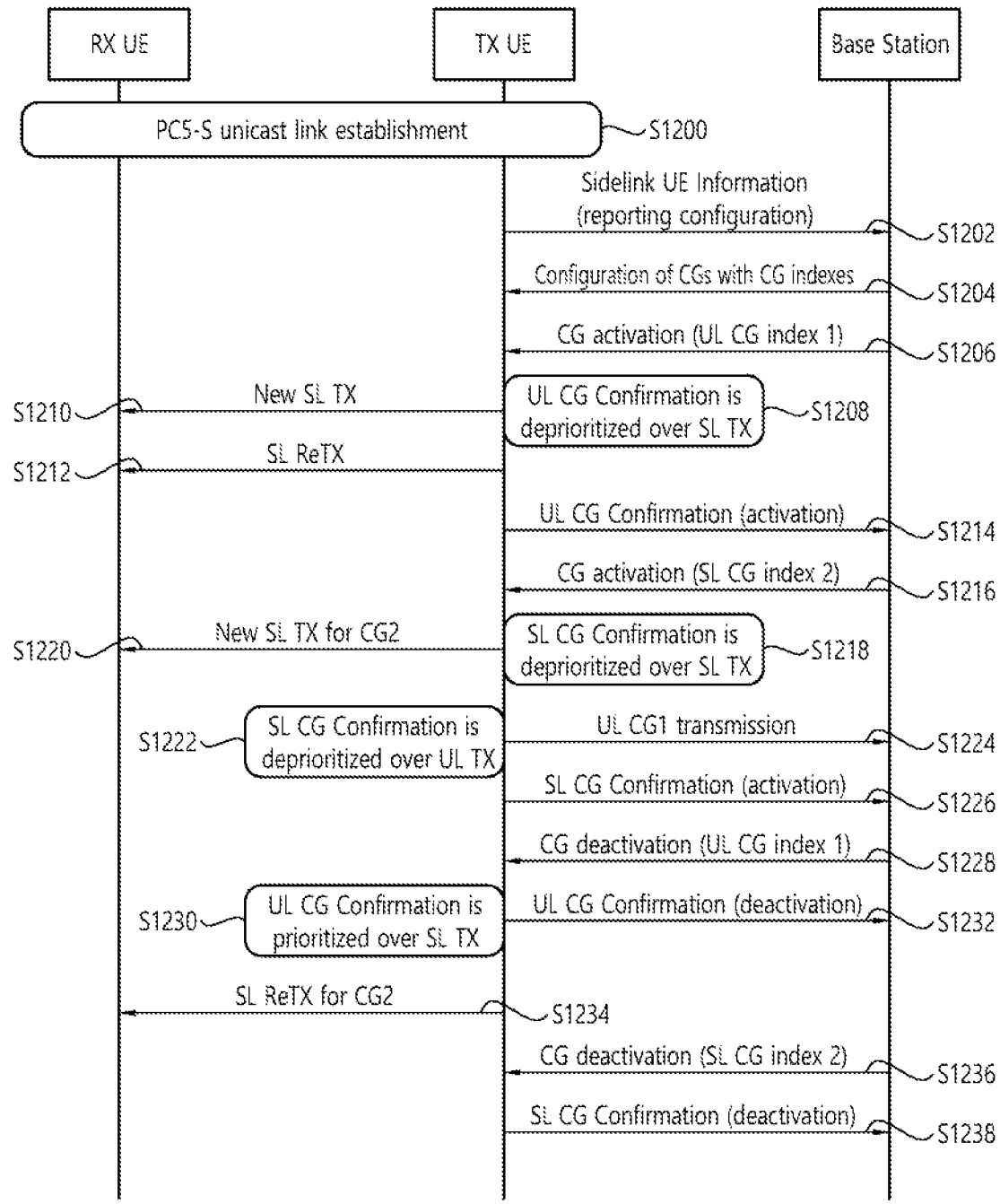
FIG. 12 shows an example of transmission of configured grant confirmation MAC CE to which implementation 2 of the present disclosure is applied.

FIG. 12 shows an example of transmission of configured grant confirmation MAC CE to which implementation 2 of the present disclosure is applied.

In step S1200, the TX UE establishes a PC5-S unicast link and the associated PC5-RRC connection with RX UE. The TX UE may transmit a PC5-RRC Reconfiguration to the RX UE.

In step S1202, the TX UE sends Sidelink UE information indicating the destination ID of the RX UE to the network.

In some implementations, if the TX UE is in RRC_CONNECTED and configured for gNB scheduled sidelink resource allocation, the TX UE may receive a grant from a network, e.g. by sending DCI in PDCCH. The DCI may include an allocated sidelink resource. The TX UE may use the sidelink grant for transmission to the RX UE. If the TX UE is configured for UE autonomous scheduling of sidelink resource allocation regardless of RRC state, the TX UE may autonomously select or reselect sidelink resources from a resource pool to create a sidelink grant used for transmission to the RX UE.

For example, in step S1204, the TX UE is configured with one or more configured grants by the network.

For example, the configured grant may be a configured grant Type 1 or Type 2.

For example, the configured grant can be a SL configured grant or a UL configured grant. That is, the configured grant may be used for either uplink or sidelink transmission.

For example, the configured grant may consist of periodic transmission occasions.

Each occasion may comprise one new transmission resource and up to two retransmission resources.

In some implementations, the TX UE may determine a priority of each configured grant.

For example, the network may indicate the priority of each configured grant.

For example, the TX UE may determine the priority of each configured grant by itself based on the highest priority of logical channels and/or a MAC CE carried in a MAC PDU over the configured grant.

For example, the TX UE may determine the priority of each configured grant by itself based on the priority of a destination which can be mapped to the configured grant.

In some implementations, the TX UE may determine a CG timer and/or CG retransmission timer for each configured grant.

For example, the value of the CG timer may be determined based on the QoS characteristics such as the minimum packet delay budget (PDB) value of logical channels which can be mapped to the configured grant.

In step S1206, the TX UE receives a PDCCH activating or deactivating one of the configured grants. For example, the TX UE receives a PDCCH activating UL configured grant having index 1. Upon receiving the PDCCH activating or deactivating one of the configured grants, the TX UE may trigger configured grant confirmation and set the priority of the configured grant confirmation to the priority of the activated configured grant.

In some implementations, if the configured grant confirmation indicates activation(s) or deactivation(s) of one or more configured grants and collides with other transmission, and if the other transmission is prioritized over the configured grant confirmation, the TX UE may deprioritize transmission of the configured grant confirmation over the other transmission, so that the TX UE may skip transmission of the configured grant confirmation and/or reduce transmission power of the configured grant confirmation. Else, the TX UE may prioritize transmission of the configured grant confirmation over the other transmission, so that the TX UE performs transmission of the configured grant confirmation while skipping the other transmission and/or reducing transmission power of the other transmission.

In some implementations, the priority of the configured grant may be set to:
    the highest priority of logical channels and/or MAC CE(s) that can be multiplexed into a MAC PDU; or
    the highest priority of logical channels and/or MAC CE(s) in a MAC PDU to be transmitted on the configured grant; or
    the highest priority of logical channels and/or MAC CE(s) that can be mapped to the configured grant in logical channel prioritization.

In some implementations, the TX UE may set the priority of the configured grant confirmation to the highest priority of the deactivated configured grant(s) only. Or, the TX UE may set the priority of the configured grant confirmation to the highest priority of the deactivated configured grant(s) and activated configured grant(s).

In some implementations, the other transmission may be prioritized, when the priority value of the other transmission is lower than a threshold and/or the priority value of the configured grant confirmation is higher than a threshold.

In some implementations, the transmission of the configured grant confirmation may be prioritized, when the priority value of the other transmission is higher than a threshold and/or the priority value of the configured grant confirmation is lower than a threshold.

In some implementations, regardless whether the other transmission is prioritized or not, if the configured grant confirmation indicates only deactivation(s) or a deactivation of at least one configured grant, the TX UE may prioritize transmission of the configured grant confirmation over the other transmission.

In some implementations, regardless whether the other transmission is prioritized or not, if the configured grant confirmation indicates only activation(s), the TX UE may deprioritize transmission of the configured grant confirmation over the other transmission.

In some implementations, if the other transmission is RACH transmission (e.g., PRACH preamble transmission), RACH transmission may always be prioritized over transmission of configured grant confirmation.

In step S1208, the TX UE determines that transmission of the configured grant confirmation for the UL configured grant is deprioritized over SL transmission.

In step S1210, the TX UE performs new SL transmission to the RX UE.

In step S1212, the TX UE performs SL retransmission to the RX UE.

In step S1214, the TX UE transmits the configured grant confirmation for the UL configured grant indicating activation to the network.

In step S1216, the TX UE receives a PDCCH activating or deactivating one of the configured grants. For example, the TX UE receives a PDCCH activating SL configured grant having index 2.

In step S1218, the TX UE determines that transmission of the configured grant confirmation for the SL configured grant is deprioritized over SL transmission.

In step S1220, the TX UE performs new SL transmission to the RX UE by using PSSCH resources of the activated SL configured grant (i.e., SL configured grant having index 2).

In step S1222, the TX UE determines that transmission of the configured grant confirmation for the SL configured grant is deprioritized over UL transmission.

In step S1224, the TX UE performs UL transmission to the network by using PUSCH resources of the activated UL configured grant (i.e., UL configured grant having index 1).

In step S1226, the TX UE transmits the configured grant confirmation for the SL configured grant indicating activation to the network.

In step S1228, the TX UE receives a PDCCH activating or deactivating one of the configured grants. For example, the TX UE receives a PDCCH deactivating UL configured grant having index 1. Upon receiving the PDCCH activating or deactivating one of the configured grants, the TX UE may trigger configured grant confirmation and set the priority of the configured grant confirmation to the priority of the deactivated configured grant.

In some implementations, if the configured grant confirmation indicates deactivation(s) of one or more configured grants (and additionally activation(s) of one or more configured grants) and collides with other transmission, and if the priority of the other transmission is lower than the priority of the configured grant confirmation, the TX UE may prioritize transmission of the configured grant confirmation over the other transmission, so that TX UE performs transmission of the configured grant confirmation while skipping the other transmission and/or reducing transmission power of the other transmission. Else, if the priority of the other transmission is higher than the priority of the configured grant confirmation, the TX UE may deprioritize transmission of the configured grant confirmation over the other transmission, so that TX UE may skip transmission of the configured grant confirmation and/or reduce transmission power of the configured grant confirmation.

In some implementations, the priority of the configured grant may be set to:
  the highest priority of logical channels and/or MAC CE(s) that can be multiplexed into a MAC PDU; or
  the highest priority of logical channels and/or MAC CE(s) in a MAC PDU to be transmitted on the configured grant; or
  the highest priority of logical channels and/or MAC CE(s) that can be mapped to the configured grant in logical channel prioritization.

In some implementations, the TX UE may set the priority of the configured grant confirmation to the highest priority of the deactivated configured grant(s) only. Or, the TX UE may set the priority of the configured grant confirmation to the highest priority of the deactivated configured grant(s) and activated configured grant(s).

In some implementations, the other transmission may be prioritized, when the priority value of the other transmission is lower than a threshold and/or the priority value of the configured grant confirmation is higher than a threshold.

In some implementations, the transmission of the configured grant confirmation may be prioritized, when the priority value of the other transmission is higher than a threshold and/or the priority value of the configured grant confirmation is lower than a threshold.

In some implementations, regardless whether the other transmission is prioritized or not, if the configured grant confirmation indicates only deactivation(s) or a deactivation of at least one configured grant, the TX UE may prioritize transmission of the configured grant confirmation over the other transmission.

In some implementations, regardless whether the other transmission is prioritized or not, if the configured grant confirmation indicates only activation(s), the TX UE may deprioritize transmission of the configured grant confirmation over the other transmission.

In step S1230, the TX UE determines that transmission of the configured grant confirmation for the UL configured grant is prioritized over SL transmission.

In step S1232, the TX UE transmits the configured grant confirmation for the UL configured grant indicating deactivation to the network.

In step S1234, the TX UE performs SL retransmission to the RX UE by using PSSCH resources of the activated SL configured grant (i.e., SL configured grant having index 2).

In step S1236, the TX UE receives a PDCCH activating or deactivating one of the configured grants. For example, the TX UE receives a PDCCH deactivating SL configured grant having index 2.

In step S1238, the TX UE transmits the configured grant confirmation for the SL configured grant indicating deactivation to the network.

In some implementations, if the uplink configured grant confirmation collides with sidelink configured grant confirmation in transmission, the TX UE may prioritize transmission of the prioritized configured grant confirmation over transmission of the deprioritized configured grant confirmation, so that TX UE performs transmission of the prioritized configured grant confirmation while skipping the transmission the deprioritized configured grant confirmation and/or reducing transmission power of the deprioritized configured grant confirmation.

In some implementations, the TX UE may set the priority of the configured grant confirmation to the highest priority of the configured grant(s). The priority of the configured grant may be set to:
  the highest priority of logical channels and/or MAC CE(s) that can be multiplexed into a MAC PDU; or
  the highest priority of logical channels and/or MAC CE(s) in a MAC PDU to be transmitted on the configured grant; or
  the highest priority of logical channels and/or MAC CE(s) that can be mapped to the configured grant in logical channel prioritization.

In some implementations, the TX UE may set the priority of the configured grant confirmation to the highest priority of the deactivated configured grant(s) only. Or, the TX UE may set the priority of the configured grant confirmation to the highest priority of the deactivated configured grant(s) and activated configured grant(s).

In some implementations, a configured grant confirmation indicating deactivation of at least one configured grant may be prioritized over a configured grant confirmation indicating only activation(s).

In some implementations, an uplink configured grant confirmation used for uplink configured grant(s) may be prioritized over a sidelink configured grant confirmation used for sidelink configured grant(s).

In summary, in FIG. 12, two configured grants, i.e., CG1 for uplink and CG2 for sidelink, are activated and then deactivated. If the confirmation to activation of UL CG1 is deprioritized over sidelink transmission, transmission of the configured grant confirmation for UL CG1 is skipped and then possibly transmitted later. Besides, if the confirmation to activation of SL CG2 is deprioritized over sidelink transmission and uplink transmission, transmission of the configured grant confirmation for SL CG2 is skipped and then possibly transmitted later.

If the confirmation to deactivation of UL CG1 is prioritized over sidelink transmission, transmission of the configured grant confirmation for UL CG1 is transmitted while SL transmission is skipped. Besides, if the confirmation to activation of SL CG2 is prioritized over sidelink transmission and uplink transmission, transmission of the configured grant confirmation for SL CG2 is transmitted while the other transmission is skipped.

According to the implementation 2 of the present disclosure, a UE performing transmissions on configured grants can properly confirm activation or deactivation of a configured grant, in particular when multiple configured grants are configured.

According to the implementation 2 of the present disclosure, the system can properly handle confirmation of configured grants for a UE performing transmissions on configured grants.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a first wireless device, comprising:
   wherein the first wireless device has been configured to transmit using pools of resources in a carrier based on sensing or random selection;
   selecting to create a sidelink grant corresponding to transmission of multiple media access control (MAC) protocol data units (PDUs);
   selecting any pool of resources configured with physical sidelink feedback channel (PSFCH) resources among the pools of resources, based on i) sidelink data being available in a logical channel, ii) a pool of resources allowed for the logical channel not being selected, and iii) a hybrid automatic repeat request (HARQ) feedback being enabled for the logical channel;
   creating the sidelink grant based on the selected pool of resources;
   performing transmission of the sidelink data to a second wireless device on resources indicated in the sidelink grant; and
   receiving, from the second wireless device, the HARQ feedback for the transmission of the sidelink data based on the PSFCH resources.

2. The method of claim 1, wherein the PSFCH resources are dedicated to the second wireless device, and
   wherein the HARQ feedback is either an acknowledgement (ACK) or a negative ACK (NACK).

3. The method of claim 1, wherein the PSFCH resources are shared by multiple wireless devices including the second wireless device, and
   wherein the HARQ feedback is a NACK.

4. The method of claim 1, wherein the method further comprises checking whether the selected pool of resources is allowed for the logical channel or not.

5. The method of claim 1, wherein the pool of resources is selected with increasing order of channel busy ratio (CBR) from a lowest CBR.

6. The method of claim 1, wherein the method further comprises selecting any pool of resources not configured with the PSFCH resources among the pools of resources, based on i) the sidelink data being available in the logical channel, ii) a pool of resources allowed for the logical channel not being selected, and iii) the HARQ feedback being disabled for the logical channel.

7. The method of claim 1, wherein the sidelink data is transmitted on a physical sidelink shared channel (PSSCH).

8. The method of claim 1, wherein the first wireless device is in communication with at least one of a mobile device, a network, and/or autonomous vehicles other than the first wireless device.

9. A first wireless device comprising:
   at least one transceiver;
   at least one processor; and
   at least one memory operably connectable to the at least one processor and storing instructions that, based on being executed by the at least one processor, perform operations comprising:
   wherein the first wireless device has been configured to transmit using pools of resources in a carrier based on sensing or random selection;
   selecting to create a sidelink grant corresponding to transmission of multiple media access control (MAC) protocol data units (PDUs);
   selecting any pool of resources configured with physical sidelink feedback channel (PSFCH) resources among the pools of resources, based on i) sidelink data being available in a logical channel, ii) a pool of resources allowed for the logical channel not being selected, and iii) a hybrid automatic repeat request (HARQ) feedback being enabled for the logical channel;
   creating the sidelink grant based on the selected pool of resources;
   performing transmission of the sidelink data, via the at least one transceiver to the second wireless device, on resources indicated in the sidelink grant; and
   receiving, via the at least one transceiver from the second wireless device, the HARQ feedback for the transmission of the sidelink data based on the PSFCH resources.

10. The first wireless device of claim 9, wherein the PSFCH resources are dedicated to the second wireless device, and
    wherein the HARQ feedback is either an acknowledgement (ACK) or a negative ACK (NACK).

11. The first wireless device of claim 9, wherein the PSFCH resources are shared by multiple wireless devices including the second wireless device, and wherein the HARQ feedback is a NACK.

12. The first wireless device of claim 9, wherein the operations further comprise checking whether the selected pool of resources is allowed for the logical channel or not.

13. The first wireless device of claim 9, wherein the resource pool is selected with increasing order of channel busy ratio (CBR) from a lowest CBR.

14. A processing apparatus, configured to control a wireless device, comprising:
   at least one processor; and
   at least one memory operably connectable to the at least one processor,
   wherein the at least one processor is configured to perform operations comprising:
   wherein the wireless device has been configured to transmit using pools of resources in a carrier based on sensing or random selection;
   selecting to create a sidelink grant corresponding to transmission of multiple media access control (MAC) protocol data units (PDUs); and
   selecting any pool of resources configured with physical sidelink feedback channel (PSFCH) resources among the pools of resources, based on i) sidelink data being available in a logical channel, ii) a pool of resources allowed for the logical channel not being selected, and iii) a hybrid automatic repeat request (HARQ) feedback being enabled for the logical channel.

* * * * *